US012116729B2

(12) United States Patent
Herchl et al.

(10) Patent No.: US 12,116,729 B2
(45) Date of Patent: Oct. 15, 2024

(54) COMMON PREPARATION OF LIGNOCELLULOSIC FEEDSTOCK AND A PRODUCT CONTAINING CELLULOSE BUT FREE FROM LIGNIN

(71) Applicant: LENZING AKTIENGESELLSCHAFT, Lenzing (AT)

(72) Inventors: Richard Herchl, Ried im Innkreis (AT); Gabriele Schild, Seewalchen (AT); Christian Weilach, Vöcklabruck (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 311 days.

(21) Appl. No.: 17/596,098

(22) PCT Filed: May 29, 2020

(86) PCT No.: PCT/EP2020/065042
§ 371 (c)(1),
(2) Date: Dec. 2, 2021

(87) PCT Pub. No.: WO2020/245055
PCT Pub. Date: Dec. 10, 2020

(65) Prior Publication Data
US 2022/0243399 A1    Aug. 4, 2022

(30) Foreign Application Priority Data
Jun. 4, 2019    (EP) .................................... 19178183

(51) Int. Cl.
*D21H 11/10*    (2006.01)
*D21C 1/08*    (2006.01)
(Continued)

(52) U.S. Cl.
CPC .............. *D21H 11/10* (2013.01); *D21C 1/08* (2013.01); *D21C 3/06* (2013.01); *D21C 3/20* (2013.01);
(Continued)

(58) Field of Classification Search
CPC ........ D21H 11/10; D21H 11/06; D21H 11/08; D21H 11/14; D21C 1/08; D21C 3/06;
(Continued)

(56) References Cited

U.S. PATENT DOCUMENTS 6,378,179 B1    4/2002    Hirsch
6,409,269 B1    6/2002    Aebischer et al.
(Continued)

FOREIGN PATENT DOCUMENTS

AT    515 152 A1    6/2015
CN    1844498 A    10/2006
(Continued)

OTHER PUBLICATIONS

International Search Report and Written Opinion of corresponding PCT/EP2020/065042, Oct. 30, 2020, 20 pages.
(Continued)

*Primary Examiner* — Jacob T Minskey
*Assistant Examiner* — Matthew M Eslami
(74) *Attorney, Agent, or Firm* — Lewis Roca Rothgerber Christie LLP

(57) ABSTRACT

A method for providing a treated cellulose-comprising mixed starting material (110), in particular a mixed starting material (110) for forming a, in particular regenerated, cellulosic molded body (102) is described. The method comprises: i) providing (10) a first starting material (101*a*) which comprises a lignocellulosic raw material, ii) providing (1) a second starting material (101*b*) which comprises a cellulose-containing lignin-free product, iii) mixing (15) the
(Continued)

first starting material (101*a*) and the second starting material (101*b*) to a mixed starting material (101), and iv) at least partially commonly treating (20) the first starting material (101*a*) and the second starting material (101*b*) for obtaining the treated mixed starting material (101), in particular a mixed pulp.

13 Claims, 5 Drawing Sheets

(51) Int. Cl.
| | |
|---|---|
| *D21C 3/06* | (2006.01) |
| *D21C 3/20* | (2006.01) |
| *D21C 5/00* | (2006.01) |
| *D21C 9/10* | (2006.01) |
| *D21H 11/06* | (2006.01) |
| *D21H 11/08* | (2006.01) |
| *D21H 11/14* | (2006.01) |

(52) U.S. Cl.
CPC .............. *D21C 5/005* (2013.01); *D21C 9/10* (2013.01); *D21H 11/06* (2013.01); *D21H 11/08* (2013.01); *D21H 11/14* (2013.01)

(58) Field of Classification Search
CPC . D21C 3/20; D21C 5/005; D21C 9/10; D21C 3/00; D21C 9/00; D21C 1/00; D21C 5/00; Y02E 50/30; C08B 16/00; C08L 97/02
See application file for complete search history.

(56) References Cited

U.S. PATENT DOCUMENTS

| | | |
|---|---|---|
| 9,540,665 B2 | 1/2017 | Barbier et al. |
| 2010/0071860 A1 | 3/2010 | Kim |
| 2016/0237619 A1 | 8/2016 | Weilach et al. |
| 2016/0257814 A1* | 9/2016 | Schade ................. B29C 43/203 |

FOREIGN PATENT DOCUMENTS

| | | |
|---|---|---|
| CN | 1861848 A | 11/2006 |
| CN | 1861849 A | 11/2006 |
| CN | 1865549 A | 11/2006 |
| CN | 1880575 A | 12/2006 |
| CN | 102677529 A | 9/2012 |
| CN | 104532639 A | 4/2015 |
| CN | 104963049 A | 10/2015 |
| CN | 105239269 A | 1/2016 |
| CN | 106480772 A | 3/2017 |
| CN | 108425259 A | 8/2018 |
| EP | 2 325 148 A1 | 5/2011 |
| EP | 3 339 504 A1 | 6/2018 |
| KR | 101568699 B1 | 11/2015 |
| RU | 2299898 C2 | 5/2007 |
| WO | WO 03/105576 A1 | 12/2003 |
| WO | WO 2008/078247 A2 | 7/2008 |
| WO | WO 2011/140628 A1 | 11/2011 |
| WO | WO 2015/052028 A1 | 4/2015 |
| WO | 2018073177 A1 | 4/2018 |
| WO | 2018142025 A1 | 8/2018 |

OTHER PUBLICATIONS

European Search Report of corresponding EP 19 178 183, Oct. 25, 2019, 9 pages.
Haule, "Textile Recycling: A Review," University of Dar es Salaam, Sep. 1, 2016, 14 pages.
Chauhan, et al., "Microcrystalline Cellulose From Cotton Rags (Waste From Garment and Hosiery Industries)," International Journal of Chemical Sciences, vol. 7, No. 2, 2009, pp. 681-688.
Wang, "Fiber and Textile Waste Utilization," ISSN 1877-2641, vol. 1, No. 1, Waste and Biomass Valorization, 2010, pp. 135-143.
Lê, et al., "Wood biorefinery based on γ-valerolactone/water fractionation," Green Chem., 2016, 18, pp. 5466-5476.
Lê, et al., "Chemical Recovery of γ-Valerolactone/Water Biorefinery," Ind. Eng. Chem. Res. 2018, 57, pp. 15147-15158.
Chinese Office action for Application No. 202080039778.7, dated Dec. 5, 2022, 26 pages.

\* cited by examiner

COMMON PREPARATION OF LIGNOCELLULOSIC FEEDSTOCK AND A PRODUCT CONTAINING CELLULOSE BUT FREE FROM LIGNIN

CROSS-REFERENCE TO RELATED APPLICATION(S)

This application is a national US phase of PCT/EP2020/065042 which claims the benefit of the filing date of European Patent Application No. 19178183.0 filed 4 Jun. 2019, the disclosure of which is hereby incorporated herein by reference.

TECHNICAL FIELD

Embodiments of the invention relate to a method for providing a treated cellulose-comprising mixed starting material, in particular a mixed starting material for forming a, in particular regenerated, cellulosic molded body. Moreover, embodiments of the invention relate to a method for manufacturing a (regenerated) cellulosic molded body from the treated cellulose-comprising mixed starting material. Furthermore, embodiments of the invention relate to the (in particular regenerated) molded body. In addition, embodiments of the invention relate to a use of a lignocellulosic raw material and a cellulose-containing lignin-free product for manufacturing the cellulosic molded body. Moreover, embodiments of the invention relate to a waste product (in particular a waste lye) from the described method and a use of the waste product as an energy production medium, by-product, or chemical product-recovery medium.

Thus, embodiments of the invention may relate to the technical field of providing treated, cellulose-containing (mixed) starting materials. In particular, embodiments of the invention may relate to the technical field of manufacturing a (regenerated) cellulosic molded body from the treated, cellulose-containing mixed starting material. Furthermore, embodiments of the invention may relate to the technical field of recycling solid matters, in particular (used) textiles.

TECHNOLOGICAL BACKGROUND

The manufacture of a cellulosic molded body, such as textile fibers, but also paper fibers, requires pulp as starting material. In principle, a pulp source for obtaining the required cellulose has to be provided. Cellulose may be obtained from plant products, such as tree trunks, for example. Furthermore, cellulose may also be obtained from recycled cellulose-comprising materials. The latter encompasses e.g. used paper or used textiles.

When using recycled materials (e.g. used textiles) as raw materials for the pulp manufacture and the subsequent textile- or paper manufacture, the problem of the purity of these recyclates may occur. They are frequently contaminated with materials which are not typical for wood. In particular, the used textiles of today are highly contaminated with plastics—on the one hand, since they consist of plastics (these ones may however be sorted as a whole), on the other hand, since today many used textiles which mainly consist of natural fibers are partially contaminated with plastic portions or a plastic was applied on a natural fiber for changing a property. Textile recycling of cellulosic fibers is not common. Presently, less than 5% of the worldwide textile market are reused. The main part (>70%) is deposited on waste disposals/combustion or is even provided for low-quality application fields (purgation- and cleaning wipes), to be finally deposited on waste disposals or in the waste combustion (25%).

The extraction of cellulose from plant products is an established practice for centuries and has two main thrusts in the subsequent application: i) paper manufacture and ii) fiber manufacture for textile and non-textile fields. Finally, i) and ii) differ in the quality of the desired cellulose semifinished products.

Currently, the recovery of cellulose from plant products and recyclates, such as (used) textiles, are performed completely separatedly. The reason for this is, that both substance groups comprise highly different properties and compositions, and therefore different treatment processes are necessary. This has the disadvantage, that elaborate and cost-intensive processes have to be separately performed in different industrial plants.

SUMMARY OF THE INVENTION

There may be a need to provide a cellulose-comprising treated starting material (e.g. for manufacturing a (regenerated) cellulosic molded body) in an efficient, robust, and resource-saving, in particular cost-saving, manner.

The subject matters according to the independent patent claims are provided. Preferred embodiments result from the dependent patent claims.

According to an aspect of the present invention, a method for providing a treated cellulose-comprising mixed starting material (in particular a mixed starting material for forming a (in particular regenerated) cellulosic molded body) is described. The method comprises: i) providing a first starting material which comprises a lignocellulosic raw material (in particular a wood material, wood, wood chips, annual plants), ii) providing a second starting material which comprises a (treated) cellulose-containing (essentially) lignin-free product (in particular textiles, used textiles, paper, used paper), iii) mixing the first starting material and the second starting material to a mixed starting material, and iv) (at least partially) commonly treating (e.g. in a boiling process and/or a bleaching process) the first starting material and the second starting material for obtaining the treated mixed starting material (in particular a mixed pulp).

According to a further aspect of the present invention, a method for manufacturing a (in particular regenerated) cellulosic molded body is described. The method comprising: i) providing an above described treated cellulose-comprising mixed starting material, and ii) forming the cellulosic molded body from the treated cellulose-comprising mixed starting material (e.g. by a lyocell method, a viscose method (in particular a carbamate method or a cold alkali method, or a paper manufacturing method).

According to a further aspect of the present invention, the treated cellulose-comprising mixed starting material (pulp) is described, which was provided according to the above explained method. The treated cellulose-comprising mixed starting material is different from typical pulp, as can be microscopically detected, for example. Furthermore, the treated cellulose-comprising mixed starting material may comprise at least one of the following features: i) intrinsic non-cellulosic foreign matters (in particular metal oxides, further in particular pigments), ii) synthetic fibers, in particular PUR, further in particular elastane, iii) 10% or less cellulose with an average degree of polymerization in the range of 50 to 200 monomers, iv) cellulose with an average degree of polymerization of 300 monomers or more (in particular 500 monomers or more), v) a portion of natural fibers (in particular cotton fibers) which is larger than 1%, in particular larger than 10%.

According to a further aspect of the present invention, a common use of a lignocellulosic raw material (in particular one of wood material and/or wood, wood chips, annual plants) and a cellulose-containing lignin-free product (in particular a treated product, such as (used) textiles and/or paper) in at least one treatment stage (in particular a boiling process) for providing a mixed pulp for the manufacture of a cellulosic molded body is described.

According to a further aspect of the present invention, a waste product, in particular a waste lye, is described (in particular a waste lye which is formed in the above described method), which comprises: i) lignin, ii) at least one reaction product from a boiling process, in particular a sulfate process or a sulfite process (further in particular one of the group, which is consisting of: sodium sulfate, sodium sulfide, calcium oxide, magnesium oxide, and sulfur dioxide), and iii) at least one of the group, which is consisting of cotton fibers and synthetic fibers (in particular plastic).

According to a further aspect of the present invention, a use of the waste product as energy production medium, by-product, or chemical product-recovery medium is described.

In the context of this document, the term "cellulose" may in particular denote an organic compound which is a constituent of plant cell walls or may be synthetically manufactured. Cellulose is a polysaccharide (i.e. a multiple sugary Cellulose is unbranched and typically comprises multiple hundred to ten thousands β-D-glucose molecules (β-1,4 glycosidic bond) and cellubiose-units, respectively. From cellulose molecules, cellulose fibers are built by plants in a controlled manner. With a technical process, glucose molecules may be agglomerated under formation of regenerated fibers.

In the context of this document, the term "molded body" may in particular denote a two- or three-dimensional geometric body which is a result of a method for manufacturing and recovering, respectively, cellulose. In particular, molded body may denote a two- or three-dimensional object which comprises or consists of cellulose and is manufactured from solved pulp. In particular, molded bodies may be lyocell-molded bodies, viscose-molded bodies, modal-molded bodies, or paper-molded bodies (paper material). Typical molded bodies are filaments, fibers, sponges and/or films. Basically, all types of cellulose molded bodies are suitable for embodiments of the invention. Both, endless filaments and cut staple fibers with conventional dimensions (for example 38 mm length) and short fibers are denoted as fibers. For manufacturing fibers, both, methods with withdrawing units downstream of one or more extrusion nozzles, and other methods, such as in particular melt-blowing-methods, may be used. Alternatively to fibers, also a cellulose-comprising foil may be manufactured as molded body, i.e. a planar and substantially homogenous film with or made of cellulose. In particular, foils may be manufactured by adjusting the process parameters of a lyocell method, such that coagulating is triggered at least partially only after an impingement of the filaments on a receiving surface. Foils may denote planar cellulose molded bodies, wherein the thickness of these foils is adjustable (for example by selecting a number of serially arranged nozzle bars). Other embodiments of a molded body are a tissue and a fleece made of cellulose filaments and made of cellulose fibers, respectively, in particular a spinning fleece made of integrally merged ("merging") substantially continuous cellulose filaments ("melt blown"). A tissue may in particular denote a textile planar web made of at least two crossed (preferably in a perpendicular or almost perpendicular manner) thread systems (or fiber systems), wherein threads (or fibers) in the longitudinal direction may be denoted as warp threads and threads (or fibers) in the cross direction may be denoted as weft threads. A fleece or nonwoven may be denoted as orderless web (which is in particular present in tangles) made of filaments or fibers or cut yarns of a restricted length, which are merged (in particular in a frictionally engaged manner) to a fiber layer or a fiber gauze. A molded body may also be created in the shape of a sphere. Also cellulose-comprising particles, in particular such as beads (i.e. a granulate and spheres, respectively) or flakes may be provided as molded bodies, which may be further processed in this form. A further molded body may be a fleece material (e.g. a network made of endless filament) which is manufactured e.g. by a melt-blown method. Possible cellulose molded bodies are also particulate structures, such as granulate, spherical powder or fibrids. A shaping of a molded body is preferably performed by an extrusion of a cellulose-containing spinning solution through an extrusion nozzle, since in this way large amounts of the cellulose molded bodies with a very uniform shape may be manufactured. A further possible cellulose molded body is a sponge or, more general, a porous molded body. According to exemplary embodiments, the mentioned molded bodies may be used for manufacturing yarns, textiles, gels, paper, cardboard, filters, or composite materials, for example.

In the context of this document, the term "lyocell-method" in particular may denote a method for manufacturing cellulose according to a direct-solvent method. The cellulose for the lyocell-method may be obtained from a starting material which contains this cellulose. In the lyocell-method, the starting material may be solved in a suitable solvent (in particular comprising tertiary amine oxides, such as N-methylmorpholine-N-oxide (NMMO) and/or ionic liquids, i.e. low melting salts, which are made of cations and anions). In particular, solving may be performed by dehydration and/or without chemical modification. In the lyocell-method, the obtained solution, which may also be denoted as dope or spinning solution, may subsequently be pressed through one or more spinning nozzles. Filaments which are formed thereby may be precipitated during and/or after their free or controlled fall through an air gap in a water-containing bath (in particular in a bath with aqueous NMMO-solution) and/or in air humidity which is present in the air gap.

Lyocell denotes a cellulose-comprising type of regenerated fiber which is manufactured according to a direct-solvent method. The cellulose for the lyocell-method is extracted from a raw material (e.g. wood, used textiles). The such obtained pulp may subsequently be solved in N-methylmorpholine-N-oxide (NMMO), a solvent, by dehydration without chemical modification, filtered, and subsequently be pressed through spinning nozzles. The filaments which are formed in this way are precipitated after passing an air gap in a bath with aqueous NMMO-solution, and are subsequently cut, e.g. to staple fibers.

In the context of this document, the term "viscose method" may in particular denote a method for manufacturing cellulose according to a wet spinning method. The cellulose for the viscose method may be obtained from a starting material (in particular wood, a wood pulp, or used textiles) which contains this cellulose.

In the context of this document, the term "viscose method" may denote a xanthogenate method. In the viscose method, which is performed as xanthogenate method, in subsequent process stages, the starting material may at first be treated with a base (for example with caustic soda lye), whereby alkali cellulose is formed. In a subsequent conversion of this alkali cellulose with carbon disulfide, cellulose-xanthogenate is formed. From this, by further adding a base (in particular caustic soda lye), a viscose-spinning solution may be generated which may be pressed through one or more spinning nozzles. In a spinning bath, viscose-filaments are generated by coagulation. The viscose-filaments manufactured in this way are subsequently cut, e.g. to viscose-staple fibers.

In the context of this document, the term "viscose method" may also denote a carbamate method, wherein instead of carbon disulfide, ammonia is used for manufacturing a soluble cellulose derivate. Instead of the cellulose-xanthogenate, the so-called cellulose-carbamate is generated. Analog to the further use of the cellulose-xanthogenate, from the cellulose-carbamate, a spinnable solution is manufactured from which, after pressing through one or more spinning nozzles, cellulose-filaments may be regenerated in a spinning bath.

Furthermore, in the context of this document, the term "viscose method" may also denote a cold alkaline method, wherein cellulose is solved without further derivatizing to the xenthogenate or carbamate in a tempered, in particular cooled, aqueous alkaline medium. In an embodiment, the temperature of the aqueous alkaline medium is less than 20° C., in particular also less than 5° C. For improving the solving behavior, additives may be added to the aqueous alkaline medium, such as urea, thio urea, zinc oxide, polyethylene glycol, or tensides. Again, from the cellulose-containing spinning solution, cellulose-filaments are regenerated after passing through one or more spinning nozzles, by precipitating in an acidic or alkaline spinning bath.

Chemical fibers and regenerated fibers, respectively, are denoted as viscose fibers, which are manufactured by a wet spinning method which is called viscose method (in particular a xanthogenate method, a carbamate method, or a cold alkaline method). The starting raw material of the viscose method is a highly pure cellulose in form of chemical pulp.

In the context of this document, the term "product" may in particular denote a processed material which differs from a raw material by the processing. For example, wood may be denoted as a raw material (in particular as a lignocellulosic raw material) for obtaining cellulose, while a textile or a paper constitutes a (already processed) product.

In the context of this document, the term "cellulose-containing lignin-free product" may in particular denote an already processed product which comprises cellulose and substantially no lignin (e.g. textiles or paper). The term "lignin-free" preferably does not relate to an absolute lignin-absence, but to "substantially lignin-free". Unavoidable residues (e.g. in the ppm range) shall also be understood as covered by the term "lignin-free".

In the context of this document, the term "textiles" may denote both "new textiles" and "used clothing" as well as "remains from a clothing manufacture".

The term "new textiles" encompasses textile raw materials (natural fibers, chemical fibers), and non-textile raw materials which were processed by one or more methods to line-, plane-shaped, or spatial products. The term "new textiles" may correspond to the term "rejects from the clothing manufacture", and may also denote finished products (e.g. clothes, bed clothes), wherein the latter was substantially not used/worn by a user yet.

In the context of this document, the term "remains from a clothing manufacture" may in particular denote rejects and/or cutting waste (German: Verschnitt) of a textile or yarn which comprises or consists of cellulose, wherein these remains occur during a method for manufacturing clothing. When manufacturing clothing, for example a cellulose-comprising textile is manufactured as starting material, from which planar portions (for example with a shape of a T-shirt half) are subsequently cut. Remains remain, which, according to an exemplary embodiment, may be resupplied to a method for manufacturing a cellulose-comprising molded body. Thus, residues from a clothing manufacture may be a starting material which comprises or consists of cellulose, which may be used for a recovery of cellulose, before a user has used the remains as clothing or in another way. In particular, remains from a clothing manufacture may substantially be made of pure cellulose, in particular without foreign matters which are separate and do not comprise cellulose (such as buttons, textile print or seams).

In the context of this document, the term "used clothes" may in particular denote cellulose-comprising clothing or home textiles (e.g bed clothes) which are already used (in particular worn) by a user when recovering at least a part of the cellulose. Thus, used clothes may be a cellulose-comprising starting material which may (but does not have to) comprise significant amounts of foreign matters, and may be used for recovering cellulose, after a user has used the used clothes as clothing or in another way. In particular, used clothes may be made of a mixture of cellulose and one or more foreign matters, in particular comprising (in particular in clothing frequently used) synthetic plastic (such as polyester and/or elastane) and/or foreign matters which are separate and do not comprise cellulose (such as buttons, textile print, or seams). In particular, polyester denotes polymers with ester functions (R—[—CO—O—]—R) in their main chain. Polycarbonates and polyethylene terephthalate belong to polyesters. Elastane in particular denotes a stretchable chemical fiber with a high elasticity. A block copolymer on which elastane is based may contain a mass portion of at least 85% polyurethane.

In the context of this document, the term "paper manufacture" may in particular denote, that from a cellulose-containing and treated starting material, a cellulosic molded body is formed, which is a paper material. In this context, a "paper material" may denote a paper starting material from which a paper product, such as a paper, a cardboard, a filter, or the like may be formed. A paper material may be a composite material which contains at least pulp (cellulose) and a binder. A "paper material" may also encompass paper or materials which are similar to paper, such as cardboard, filter material, isolation mats, absorbing fleeces, fiber-reinforced planar materials, etc. The paper material may be formed by dehydration of a fiber suspension, e.g. on a sieve. A paper material may be a planar material (fiber fleece) which substantially consists of (cellulose) fibers. The paper material may be further compacted and dried in subsequent process stages. All processing stages which lead from a cellulosic molded body to a paper material may be denoted as paper manufacturing method. Furthermore, also all processing stages which lead from a cellulosic molded body to a paper and/or from a paper material to a paper product, may be denoted as paper manufacture.

In the context of this document, the term "treating" may in particular denote, that an incoming starting material is processed (treated), such that an outgoing, treated starting material in its chemical/physical properties and in its material composition, respectively, at least partially differs from the incoming starting material. For example, a treatment process may comprise a boiling process. Furthermore, a treatment process may comprise a bleaching process. Moreover, a treatment process may comprise a purification process or a drying process.

In the context of this document, the term "lignocellulosic raw material" may denote a vegetable renewable raw material which contains cellulose and lignin in its skeletal structure. Examples for lignocellulosic raw materials may be: wood and/or wood material, in particular wood chips, and annual plants.

The term "wood" may denote the rigid tissue of plants (trunk, branches, and twigs), such as trees and shrubs. Characterizing for wood may be the incorporation of lignin (in particular in cell walls). Correspondingly, wood may also be understood as lignified (woody) vegetable tissue.

In the context of this document, the term "wood material" may in particular denote each material which is manufactured from wood, consists at least partially of wood and/or comprises wood. A tree trunk may constitute a wood material, as well as wood flakes or wood chips. In a broader sense, also a paper (material), which was manufactured from wood, may be a wood material.

In the context of this document, the term "annual plants" may in particular denote such plants, which prosper within one vegetation period from the germination to the ripeness for harvest. Examples for "annual plants" may be: linter (from cotton), hemp, jute, flax, linen, grain (wherein straw occurs as by-product), elephant grass (*Miscanthus sinensis*). Despite annual plants comprise lignocellulose, they are essentially to a large extent non-lignified.

In the context of this document, the term "mixed starting material" may in particular denote, that at least two starting materials which principally differ from each other (e.g. wood and textiles) are mixed, to obtain a mixed starting material. Conventionally, different types of wood (e.g. poplar, birch tree, and maple) may be commonly digested. They have to possess similar wood qualities to enable the mixing. However, a mixing of lignocellulosic raw materials, such as wood, with lignin-free products is conventionally not known/successful. The mixing may be performed at different points in time of a treatment (e.g. a boiling process or a bleaching process). Also more than two starting materials may be mixed, to obtain a mixed starting material (for example a wood material, used textiles, and used paper). In an embodiment, the mixed starting material may be a mixed pulp which comprises pulp from wood material and from used textiles. Furthermore, the mixed starting material may comprise remains from the starting materials, e.g. lignin or synthetic fibers.

The term "synthetic plastic" may in particular denote a material which is made of macromolecules and is manufactured synthetically. The respective macromolecules of a plastic are polymers and are therefore made of repeating basic units (repeating units). The size of the macromolecules of a polymer may vary between some thousands up to more than one million basic units. For example, the polymer polyethylene (PE) consists of connected, multiply repeating ethylene units. The polymers may be unbranched, branched, or cross-linked molecules. With respect to their physical properties, plastics may be principally classified into three groups: thermoplast, thermosetting plastic (German: Duroplast), and elastomers. Furthermore, these properties may also be combined in subgroups, e.g. in case of thermoplastic elastomers. Important features of plastics are their technical properties, such as formability, hardness, breaking strength, temperature-, heat resistance, and chemical resistance, which may be broadly varied by the selection of the macromolecules, manufacturing methods and typically by adding additives. Typical reactions for manufacturing synthetic plastic from monomers or pre-polymers are: chain polymerization, polyaddition, or polycondensation. Examples for synthetic plastics which are in particular also used in textiles, are e.g. polyurethane (PUR), in particular as constituent of elastane, polyester (PE, e.g. polyethyleneterephtalate (PET)), polyimide (PA, e.g. nylon, perlon), and polyether, in particular polyethylene glycol (PEG) as constituent of elastane. In this context, synthetic plastic may form the synthetic fibers in a textile and/or used textile.

According to an embodiment, the invention may be based on the idea, that a cellulose-comprising treated starting material (e.g. for manufacturing a (regenerated) cellulosic molded body) may be provided in an efficient, robust, and resource-saving (in particular cost-saving) manner, when a first starting material which comprises a lignocellulosic raw material (e.g. a wood material), and a second starting material which comprises cellulose-containing lignin-free products (e.g. used textiles) are mixed during a treatment process and are (at least partially) commonly treated. Conventionally, a wood-fraction and a recyclate-fraction are separately treated due to the highly different composition, which leads to a high effort and to high costs. In addition, the treatments have also disadvantages, such as too short cellulose chain lengths and high concentrations of plastic fibers. However, it has surprisingly turned out now, that it is advantageously possible to commonly treat a lignin-containing (e.g. wood material)-fraction and a lignin-free (e.g. textile)-fraction. In this way, two separate industrial plants may be combined and both effort and costs may be saved. Moreover, also conventional problems of the separated treatment processes may be overcome. In this context, the finding is especially unexpected, that the common treatment (e.g. boiling) process is not only technically possible, but at the same time is advantageous with respect to the properties of a treated mixed starting material and/or the molded body to be manufactured from it. For example, it has turned out, that a sequence of ingredients of the used textiles and/or their degradation products interact with typical molecule structures of the lignin (e.g.: —OH, —CO, —COOH) and are thus durably separated from the desired pulp (of the cellulose).

In an embodiment, the type and the amount of the reagents to be used, the pH-value, the temperature, and the pressure conditions, as well as reaction times, require substantially no adaption with respect to the known and approved wood digesting methods.

Thus, the described method may be implemented in present industrial plants under most extensive consideration of present and approved method stages and maintaining the previous provisions for closed cycles (environmental protection aspects). This is of special interest, mainly since thereby the industrial plants and systems which are already in operation, which correspond to possible requirements, reach-standards and possible operating licenses, may be further operated in this way with minimum adaptions/changes.

In an embodiment, the main advantage of embodiments of the invention may be seen in that the method is significantly simplified, and that the costs of production are significantly lower.

Furthermore, the described method leads to the production of a new waste lye which may be further processed in an advantageous manner (especially high calorific value) in already existing industrial plants, e.g. for obtaining by-products, or for an energetic use (combustion). Thus, no separate treatment of the waste lye is required, but a surprisingly advantageous use as energy production medium.

According to an embodiment, the lignocellulosic raw material comprises at least one of the group, which is consisting of: a wood material (for example wood), in particular wood chips, annual plants. This has the advantage, that renewable raw materials may be directly used as cellulose-source.

According to a further embodiment, providing the first starting material further comprises: preparing the lignocellulosic raw material, in particular comminuting, further in particular removing bark. Therefore, the lignocellulosic raw material may be supplied to the described method in an efficient and established way.

As raw material for the wood material, suitable tree trunks may be used, for example. In a first preparing stage, they may be mechanically decorticated in a known manner. Moreover, the decorticated tree trunks may be mechanically split, if necessary in multiple differentiated stages, to so-called "wood chips". Usually, these wood chips (or wood flakes) comprise a length in the range of 2 to 8 cm and/or a thickness in the range of 0.2 to 2.0 cm. These length- and thickness specifications may respectively relate to an average value. Furthermore, these length- and thickness specifications may relate to absolute values, so that, within a charge of wood chips, the dimensions of each wood chip are substantially in the given ranges. Preparing the wood material may moreover encompass mixing different wood types and/or wood-fractions. Mixing may be performed selectively, to provide a first starting material with certain desired properties.

Further comminuting stages may orient themselves at the dimension of the fiber lengths which are desired for a certain quality. The physical entering time for liquid reagents and the velocity of flushing out reaction results may act as a time brake, the larger the volume to be entered (i.e. the size of the wood chip) is. The smaller the wood chip is comminuted, the more homogeneous and shorter may be the fiber lengths.

According to a further embodiment, the cellulose-containing lignin-free product comprises at least one of the group, which is consisting of textiles (in particular used textiles) and paper. This has the advantage, that already processed products may be efficiently recycled as cellulose-source.

According to a further embodiment, providing the second starting material further comprises: preparing the cellulose-containing lignin-free product, in particular comminuting, further in particular at least partially removing non-fiber foreign matters (e.g. buttons, zip fasteners, rivets, coatings ...). In this way, also the used textiles may be supplied to the described method efficiently and in a composition which is as pure as possible and advantageous, respectively.

Typically, the textiles may comprise a predominant portion of cellulosic fibers (e.g. cotton, viscose, lyocell), but at least partially also synthetic fibers. At first, the (used) textiles may be mechanically freed from non-fiber foreign matters, such as buttons, zip fasteners, and further applications. This may be performed by mechanically comminuting, such as a milling; cutting, and shredding. In an embodiment, the (used) textiles may be split into segments which correspond in their dimensions (length and thickness) substantially to the dimensions of the wood chips (see above). Thereby, on the one hand a proper mixability and a stable consistence in the boiling process, on the other hand a comparable length-thickness of the resulting cellulose fibers may be ensured. Preparing may also comprise the use of automatic sorting plants which may distinctly reduce the portion of metallic buttons, rivets, coatings and the like.

In a further embodiment, certain non-fiber foreign matters (e.g. buttons made of plastic (typically made of cured, unsaturated polyester-UP) or horn (keratin proteins)) may be left in the second starting material. This is caused by the fact that in a subsequent boiling process under the typical boiling conditions, an at least partial saponification may occur. The boiling duration of the entire batch may be longer and/or the conditions (e.g. lye concentration, temperature, pressure) may be adapted. From metal-foreign metals, in particular aluminum may be oxidized under strongly alkaline boiling conditions to water-soluble aluminates. Brass is neither resistant with respect to NaOH, nor with respect to $Na_2S$.

According to a further embodiment, the textiles (in particular used textiles) comprise non-cellulosic foreign matters (in particular synthetic fibers, such as plastic fibers). Providing may then further comprise: i) mechanically separating at least a part of the non-cellulosic foreign matters, and/or ii) chemically separating at least a part of the non-cellulosic foreign matters. This may have the advantage that thoroughly depleting may be performed with known and established methods.

According to an embodiment, separating the non-fiber constituents from the fiber constituents may be performed due to different physical properties, in particular by metal deposition and/or gravitational deposition. Metallic components (e.g. zip fasteners, rivets, etc.) may be separated due to their magnetic properties, for example. Also different influences of the gravitational force on the different constituents may be utilized for separating.

According to an embodiment, mechanically separating may be performed based on density differences between the non-cellulosic fibers and the cellulosic fibers. For example, in a centrifuge, materials with a different density may be separated due to differently strong centrifugal forces. After transferring the constituents in a liquid medium, due to different densities, they may partially collect at the surface, while other constituents are floating or deposit at the ground.

According to an embodiment, mechanically separating may be performed based on different electrostatic properties between the non-cellulosic fibers and the cellulosic fibers. Due to different electrostatic properties, the different fibers may react upon an applied electric field in a different way. This in turn enables separating the cellulosic fibers with respect to non-cellulosic fibers.

According to an embodiment, mechanically separating may comprise suspending (i.e. transferring into a suspension) the fiber constituents in a liquid medium, in particular an aqueous medium, and separating the non-cellulosic fibers from the cellulosic fibers due to different physical properties in the liquid medium (in particular different gravitational, centrifugal force-related, floating and/or electrostatic properties). When the different fibers in a liquid medium show a different behavior due to their different composition, this enables a separation of the different fiber constituents as well.

According to an embodiment, the liquid medium may comprise at least one additive for enhancing the different physical properties, in particular a dispersing agent and/or a swelling agent. In particular, a dispersing agent or dispersant may denote additives which enable or stabilize dispersing, i.e. a fine distribution of a substance (for example a fiber) in a continuous medium (for example in a liquid). In particular, a swelling agent may denote additives which promote a swelling of a substance. Swelling may denote a process, wherein a substance (in particular a liquid) introduces into a solid body and causes an enlargement of the latter. When one or more such additives are added to the medium, the discrepancies in the properties of the diverse fibers, which are necessary for the mechanical separation of the different fibers, may be increased. This increases the efficiency of the separation.

According to an embodiment, chemically separating may comprise selectively solving only at least a part of the non-cellulosic fibers or only at least a part of the cellulosic fibers in a solvent, and separating, in particular filtering, at least a part of the non-solved fiber constituents. In other words, the different fibers may be supplied to a (for example liquid, in particular aqueous) medium, in which only certain ones of these fibers, in particular selectively polyester fibers, distinctly solve, whereas other fibers, in particular cellulose fibers, show no or only a weak solving behavior. The fibers which do not solve or do not considerably solve or solve weaker (in particular cellulose fibers) may be filtered or centrifuged and may then be further treated separately from the solved fibers.

According to an embodiment, mechanically separating and/or chemically separating may comprise a separating of synthetic fibers as non-cellulosic fibers. In the reused textile materials, in particular used clothes and/or textile waste residues, non-cellulosic fibers of a synthetical origin are frequently found. As example for such synthetic fibers, polyester, polyamide and/or elastane may be mentioned. These may be effectively separated from the cellulose fibers by the here described methods.

According to an embodiment, chemically separating may comprise supplying an alkaline solution, in particular using oxidizing agents, in particular an alkaline boiling (e.g. in NaOH). In particular, supplying the alkaline solution for degrading non-cellulosic fibers, in particular synthetic fibers, further in particular polyester fibers, may be performed. Especially polyester may be thereby split into water-soluble constituents which may be separated from the cellulose fibers by the wastewaters which occur in the process.

According to a further embodiment, the non-cellulosic foreign matters, in particular synthetic fibers, are at least partially retained in the second starting material. This may have the advantage, that certain advantageous properties (e.g. stability, stretchability, elasticity, durability) may be provided in the obtained (treated) mixed starting material and/or the molded body to be manufactured. In an embodiment, synthetic fibers (e.g. polyester, but also polyurethane, in particular elastane or polyamide) may be at least partially retained in the second starting material.

According to a further embodiment, the method further comprises: partially depleting (in particular selectively depleting) the non-cellulosic foreign matters from the cellulose, such that at least one predefined synthetic plastic at least partially remains in the depleted starting material (in particular such that the formed molded body comprises predefined properties). This has the advantage, that properties of the treated mixed starting material, and thus also of the molded body to be manufactured, may be controlled in a specific and simple manner, while at the same time the depleting process may be performed in a less complex manner. It has surprisingly turned out that, by a specific control of residual concentrations in the course of the treatment method (i.e. the treatment and/or the preparation of the used textiles), new properties may be achieved in the treated mixed starting material and/or the molded body to be manufactured.

In particular, by a specific portion of residual polymers (preferably polyurethanes, such as elastane), a compensation (increase by the elastane portion, reduction by used cellulose) the rigidity values may be achieved, which would normally be significantly reduced by adding recycled cellulose, since the recycling process is accompanied by a reduction of the average chain length.

In a further embodiment, by the treatment of the second starting material, it is ensured that the remaining residual polymers (e.g. PU, PA, PET, polyester etc.) are present in a suitable concentration (respectively depletion) (wherein no complete degradation has to be necessary), so that, besides processing forms which are typical for textiles, also a suitability for a binder-based further processing is present. In particular, the residual non-cellulose residues may act as a substitution of naturally absent hemicellulose in used textiles and may reduce a possible binder portion in the manufacture of cellulosic molded bodies, in particular in paper processes. The specific control of these portions in the course of the method may cause a corresponding pre-optimization of the resulting quality of the cellulosic molded body to be generated.

According to a further embodiment, treating further comprises: performing a boiling process. This may be e.g. a sulfate process and/or a sulfite process. Furthermore, the boiling process may be an organosols process (in particular gamma-valerolactone process). This has the advantage, that efficient and established methods may be directly applied. Especially surprising is the finding, that (at least partially) commonly boiling a lignocellulosic raw material, such as wood, and lignin-free products, such as textiles, is not only possible, but also has advantages with respect to the properties of the mixed starting material/molded body.

The boiling process may be a multistage boiling process. For example, the boiling process may also encompass a pre-hydrolysis.

In the context of this document, the term "alkaline digestion methods (German: aikalische Aufschlussverfahren)" may denote, that the pH-value in the process is alkaline, i.e. pH>7.

A usual alkaline digestion method is the kraft- or sulfate process. The active digesting chemicals are the hydroxide- and hydrogen sulfide-ions OH— and HS—. For manufacturing the boiling lye, substantially sodium sulfide ($Na_2S$) and caustic soda (NaOH) are used.

In particular for the manufacture of highly pure chemical pulp which is used for the manufacture of (in particular regenerated) cellulosic molded bodies, a so-called pre-hydrolysis stage is performed upstream of the actual sulfate boiling. In this stage, hemicelluloses from the lignocellulosic raw material are transferred into easily soluble forms and may thereby be separated from the cellulose. Despite the actually alkaline digestion process, the pre-hydrolysis is performed in the acidic pH-range. The required pH-value may be adjusted by specifically adding acids or also by a release (with steam) of the organic acids which are contained in the lignocellulosic raw material itself.

A further alkaline method is the soda-digestion. NaOH is used as main chemical product. In all alkaline methods, catalysts, such as anthraquinones or low amounts of further boiling auxiliary substances may be used, such as tensides.

A sulfate process is also denoted as sulfate digestion or -method, respectively due to the more rigid fibers also as kraft-method. The active substances may be caustic soda and sodium sulfide (sodium sulfate ($Na_2SO_4$) may be used for the recovery). The starting material (e.g. wood chips and/or used textiles) may be impregnated with the boiling lye and may be supplied to a reactor device (boiler). At a temperature of 170° C., for example, wood constituents, such as hemicelluloses and lignins, may be solved in alkali. A degradation of the cellulose fibers may be undesired. In particular for the manufacture of highly pure chemical pulps, a pre-hydrolysis stage may be performed upstream of the actual sulfate boiling.

For a sulfite process, e.g. liquid sulfur dioxide may be used. The acidic sulfite process may solve the bond between lignin and cellulose by sulfonation and ether splitting of the lignin. The sulfite process may be performed as calcium bisulfite (calcium hydrogen sulfite) or as magnesium bisulfite (magnesium hydrogen sulfite) process.

In a further embodiment, the boiling process may be performed by an organosols process, in particular with an aqueous solution of gamma-valerolactone (GVL) as gamma-valerolactone process.

Organosolv boilings are characterized in that an organic solvent, such as methanol or ethanol is used in large amounts as substantial digestion chemical product for the lignin removal. These processes may be performed in an alkaline milieu, such as the ASAM-method, or in an acidic milieu, such as the acid-catalyzed milox- or formacell-method. The facilities have to be explosion-proof and the recovery of the solvent is performed by a simple distillation.

An example of the group of the organosols-methods is fractionalizing with a mixture of gamma-valerolactone and water. With this process, lignin may be very efficiently solved from the first starting material, without too strongly degrading the cellulose. At the same time, in a common boiling of the first starting material with the second starting material, a large part of the colorants and textile auxiliary substances may be also removed and solved by GVL (due to its structural similarity to lignin), without too badly damaging the cellulose in the second starting material. Thus, the boiling process may be performed distinctly more efficiently and resource-savingly, and the starting material is less badly damaged. Furthermore, a subsequent bleaching process may be operated more gently, since colorants may be already removed in the boiling process to a large extent. Possible boiling parameters are e.g. a boiling temperature of 140-180° C. with 35-75 weight % GVL in water, with a boiling time of 50-180 minutes. A further advantage of the boiling process with GVL may be the simple recovery of the process chemical product GVL.

Despite the described processes are configured for the lignin digestion (separating of cellulose and lignin), it has surprisingly turned out, that all three process types are suitable for digesting into fibers and/or to release both a wood material and used textiles, and to separate non-cellulosic constituents.

In an embodiment, the type and the amount of the reagents to be used (e.g. NaOH, MgHSO$_3$, Na$_2$S), the pH-value, which may change in the reaction progress, but also temperature and pressure conditions and reaction times, do substantially not require an adaption with respect to the known and approved wood digestion methods.

Thus, the described method may be implemented in present industrial plants under most extensive consideration of present and approved method stages and maintaining the previous provisions for closed cycles (environmental protection aspects). This is of special interest, mainly since thereby the industrial plants and systems which are already in operation, which correspond to possible requirements, reach-standards and possible operating licenses, may be further operated in this way with minimum adaptions/changes.

In particular synthetic fibers (and other non-fiber foreign matters) may be separated with the described process. The separation (e.g. PET, PA6.6, PA 6, optical brightener, lubricants in the textile processing) may be more rapid and simple in many cases as the actual lignin digestion from the wood material. It has turned out, that the synthetic fibers (polymer constituents) of the textiles may be (at least partially) degraded, e.g. respectively to below 1000 ppm, in case of a suitable process control to below 100 ppm. This may be performed according to the examples which are described below, here outlined at the example of the sulfate process (alkaline conditions).

PET: saponification (hydrolysis) in terephthalic acid (TPA) and ethylene glycol, wherein ethylene glycol is oxidized to a large extent. TPA may be recovered from the lye by acidification.

PP (polypropylene): oxidation, in particular at the tertiary carbon atoms, to polymer fragments (hydroxyl- or carboxyl groups). These fragments may be water-soluble in an alkaline medium.

PAN (polyacrylic nitrile): saponification, substantially in an alkaline medium to polyacrylamide. The latter is water-soluble and, at a corresponding concentration by hydrogen bonds, leads to a noticeable increase of the viscosity. This may lead to stabilization of the inhomogenous boiler-content and may moreover keep fine matter (e.g. pigments, filling materials, matting agents on inorganic basis, such as TiO, ZnO, SiO$_2$) floating.

PUR (polyurethane)/elastane: saponification under given alkaline circumstances. The polyglycol-block portions which are typical for elastane are also saponified and/or are transitioned in a simultaneous oxidation with oxygen to small molecular fragments.

PA6.6 and PA6 (polyamide): saponification to dicarboxylic acid and amines and/or aminocarboxylic acids, wherein these substances are water soluble.

Optical brighteners: become water-soluble by reaction to sulfonic acid salts.

Organic pigments/colorants: are either degraded or released as fine matters which are not retained by the subsequent filtration.

A special advantage of the described method may be that multiple ingredients of the used textiles and/or their degradation products (in particular polyester) interact with typical molecule fragments of the lignin (e.g.: —OH, —CO—, —COOH) and are therefore sustainably separated from the desired pulp (of the cellulose).

In other words, in an embodiment, it is proposed to treat (used) textiles of all types, i.e. also those with portions of polymer fibers and/or wool not only by aqueous caustic soda (NaOH) at the boiling temperature, as presently common, but to subject them to such processes which lead to the separation of lignin (and other constituents) of pulpes from vegetable raw materials. Such are boilings according to the sulfate process by aqueous NaOH, Na$_2$S, the sulfite process by aqueous Ca/Mg-bisulfite, or an organosolv process, however characterized in that this digestion is performed commonly with a wood portion (in particular of approximately 10% to 99% (with respect to the total weight of the solid masses)).

In the following, some further embodiments of the treatment process are described.

According to a further embodiment, treating comprises: performing a bleaching process (in particular after the boiling process). This has the advantage, that further treatment processes may be performed downstream of the boiling in a flexible way.

In particular after the boiling process, the exposed cellulose fibers may be filtered, washed, and bleached by alkali/acid. A process may be denoted as bleaching, which removes or attenuates undesired colorings. In bleaching, bleaching agents are used, which are oxidizing or reducing compounds, which should be at least partially selective. For example, bleaching agents may attack coloring substances by destroying the chromophores. As bleaching agents, e.g. oxygen, ozone, hydrogen peroxide, chlorine-compounds (e.g. chlorine dioxide or hypochlorite), but also enzymes may be used.

Bleaching may comprise at least one of a group which is consisting of oxidative bleaching, reductive bleaching, and enzymatic bleaching. According to a preferred embodiment of the invention, bleaching may comprise performing an acidic washing, followed by performing an ozone bleaching, in turn followed by performing a peroxide bleaching. By bleaching, colorants and other chemical residual substances in the recycled textile materials may be removed.

A bleaching line may have multiple stages and the mixing may be performed in each stage. For example: i) a sulfite boiling of the first starting material with a subsequent O-delignification, and ii) in parallel a textile digestion without O-delignification (since there is no lignin in cotton), and subsequently iii) common bleaching for achieving the final degree of white.

According to a further embodiment, treating further comprises: performing a cleaning process. The person skilled in the art knows a variety of cleaning stages which may be performed, to provide a desired purity of the mixed starting material.

According to a further embodiment, treating comprises: performing a drying process of the treated mixed starting material, in particular a mixed pulp.

According to a further embodiment, treating further comprises: supplying an (in particular pressurized) oxidizing agent (in particular oxygen) to the boiling process.

Due to the process-related simplicity of the control of the oxygen supply, it is possible to react to measuring parameters in a rapid and precise manner, which measure the degree of degradation of the undesired additional constituents of the starting material. Some foreign matters (e.g. PP, RUR, PAN, elastane, direct color pigments) may prove to be stable and may be degraded in an advantageous manner by an additional oxidation with oxygen during the boiling process in the pregiven time. In especially persistent cases, an addition of elementary sulfur (e.g. 8 to 10 kg/ton may trigger an additional oxidation effect. The resulting hydrogen sulfide ($H_2S$) may be bound in the alkaline medium.

According to an exemplary embodiment, in the paper industry, it is permanently searched for de-inking methods with possibly low additional aggressive chemicals. This so-called de-inking is implicitly achieved in the method according to embodiments of the invention. By boiling, in particular a hot boiling with additional oxygen, the textile colorant residual constituents are dissolved to such an extent, that it acts like a de-inking method as well. However, this special de-inking is performed without additional chemical or physical measures, since the used chemicals and processes are already mandatorily required for the digestion of the used textiles to be recycled. Furthermore, in the paper industry, de-inking methods are based on sorting and flotation for removing printing color. These processes are also applied as standard in the standard process of the pretreatment of used textiles for recovering pulp. When mixing a such manufactured cellulose with cellulose from the paper recycling at corresponding boundary conditions, this leads to an additionally whiter pulp mixture and thus to a whiter paper, which additionally reduces the subsequent bleaching stages.

According to a further embodiment, treating further comprises: increasing the pressure during the boiling process above the atmospheric pressure. Thereby, the boiling process (in particular the oxidation) may be performed especially efficiently.

According to a further embodiment, treating comprises: mixing the first starting material and the second starting material, such that the portion of the first starting material is in the range of 1 to 99% (in particular 5 to 90%, further in particular 10 to 80%), in particular 10 to 99%, with respect to the total weight of the solid masses.

In a further preferred embodiment, boilings which are guided in parallel may be used, which are operated with respectively different mixing ratios of textile:wood of 1:99 to 99:1. After the finished digestion, the material streams are subsequently combined, prior or after the separation of the raw cellulose (brown substance (German: Braunstoff)), but in each case prior to a common bleaching.

According to a further embodiment, treating comprises: mixing the first starting material in form of a liquid cellulose suspension with the second starting material in form of a liquid cellulose suspension. This has the advantage, that mixing may be performed especially efficiently.

A combination of the both liquid cellulose-fractions from a first boiling of the first starting material and a second boiling of the second starting material may be performed. This variant presupposes a previous, at least partial, separate boiling of the wood- and the textile-fraction. In a variant of this embodiment, liquid cellulose-fractions from a previous common boiling are used, which however contain different wood- and/or textile portions.

According to a further embodiment, treating comprises: performing the boiling process, such that the average degree of polymerization of the cellulose is within a predefined range.

In particular, the cellulose comprises an average degree of polymerization of 200 monomers or more, further in particular 300 monomers or more, further in particular 500 monomers or more. The cellulose comprises 10% or less cellulose with an average degree of polymerization in the range of 50 to 200 monomers. This has the advantage, that an especially high-quality cellulose may be provided, e.g. for the paper manufacture.

In the context of this document, the term "degree of polymerization" may denote the number of basic units (monomers) per polymer molecule (e.g. cellulose molecule). The degree of polymerization may be identical with the quotient of the average molar mass of the polymer and the molar mass of its repeating unit (the monomer unit). The exact number, except in case of proteins, may frequently be only an average value over the considered sample. This average value is denoted as average degree of polymerization (DP). The degree of polymerization and the geometric distribution of the monomers in the molecule (i.e. the stereochemical arrangement of the molecule branches) may possess a large influence on the physical and especially the mechanical properties of a polymer. For example, the DP for cotton is approximately 3000 or more, for viscose fibers 250 to 700, for polyimide 100 to 180, and for polyester 130 to 220.

In selectively depleting, cellulose with a short chain length may be intentionally removed from the starting material, so that the cellulose of the starting material comprises an average degree of polymerization in a predefined range. For example, a mechanical separation, in particular a density separation, may be performed, to remove the shorter (more lightweight) cellulose polymers from the longer (more heavyweight) cellulose polymers.

An advantage of the method is that such short chains are degraded to water-soluble oligomers. In a certain analogy, they behave like the hemicelluloses from the wood segments.

According to a further embodiment, treating further comprises: performing an enzyme process. An enzyme treatment with enzymes, such as proteases, mannanases, etc. enables to degrade undesired constituents, such as peptide residues, hemicelluloses, etc. In an advantageous manner, the enzyme process may be performed at the mixed starting material after the boiling (e.g. cooled to approximately 60 degree).

According to a further embodiment, treating comprises: performing a continuous process, in particular comprising: i) continuously providing the first starting material and/or continuously providing the second starting material, ii) continuously mixing the first starting material and the second starting material, and iii) at least partially commonly continuously treating the mixed starting material. This may provide the advantage, that the method may be operated in a stable manner over a long term.

In the context of this document, the term "continuously" may in particular denote, that a technical process is performed without interruptions. In other words, a (continuous, "steady-state") long-lasting material flow (which comprises at least the stages i) supplying, ii) treating, and iii) discharging) may be performed which is substantially not interrupted. In contrast, a discontinuous process is frequently interrupted, since a treatment is performed batchwisely (respectively chargewisely). In the continuous process, supplying and discharging may also be performed continuously. For example, a reaction device may be formed at least partially tube-shaped, such that the starting material is continuously supplied to a first opening, and treated starting material may be continuously discharged from a second opening, while in between continuously treating and moving takes place (e.g. by a conveyor screw).

In a continuous process, the ratios of the first starting material and the second starting material may be frequently changed, since in contrast to a batch-production, these mixing ratios may be dynamically varied due to measuring results.

According to a further embodiment, mixing further comprises: mixing the first starting material and the second starting material at one of the following points in time: i) prior to a pre-hydrolysis, ii) prior to the boiling process, iii) during the boiling process, iv) after the boiling process, v) prior to the bleaching process, vi) during a bleaching sequence, viii) after the bleaching process, ix) prior to a drying. By defining a certain mixing time, desired advantageous process conditions and/or properties of the mixed starting material may be specifically controlled. In particular by differently long dwell times in the boiling process and/or in a subsequent (e.g. bleaching) process, parameters, such as the cellulose chain length (degree of polymerization), may be efficiently influenced.

In an embodiment, the first starting material and the second starting material are at first treated separately from each other. For example, each starting material may be subjected to an own boiling, whose conditions are precisely tailored to the material composition. These parallel boilings may be operated in different modes of operation (e.g. sulfate- or sulfite-process, organosols, with or without $O_2$-delignification, etc.). In this embodiment, after the separation of the raw cellulose, the waste lyes may be treated in a known manner (e.g. recovery of valuable material, combustion for an energy production, etc.). The boiling process may be performed in multiple stages, and mixing may be performed during a certain stage of the multistage boiling process.

In an embodiment, the treated starting materials (for example raw cellulose-fractions) which are obtained from the starting materials may be supplied to a common bleaching. As special optional variant of this embodiment, for the first starting material and for the second starting material, a different supplying time in a subsequent process may be selected, e.g. a bleaching process. This may enable an optimization of the opposite properties for both starting material-fractions. On the one hand, by the exposition duration of the fractions in the bleaching, the degree of bleaching may be controlled (ideally a long bleaching duration, so that a high bleaching effect is achieved). On the other hand, by a long exposition duration in the bleaching, the chain degradation is accelerated. By the possibility of the different supplying times, these quality-determining parameters may be optimized.

According to a further embodiment, mixing further comprises: supplying the first starting material to the boiling process and subsequently supplying the second starting material to the boiling process (in particular when the second starting material comprises a low portion of non-cellulosic foreign matters). This has the advantage, that the used textile-fraction has to be exposed to the treatment process for a less long time, whereby in particular a longer cellulose chain length may be achieved.

According to a further embodiment, mixing further comprises: supplying the second starting material to the boiling process and subsequently supplying the first starting material to the boiling process (in particular when the second starting material comprises a high portion of non-cellulosic foreign matters). This has the advantage, that a used textile-fraction which comprises an especially high portion of non-cellulosic foreign matters, in particular synthetic fibers, is supplied to a longer and thus more efficient treatment process.

In an embodiment, a pre-analysis of the starting material may be performed. If the presence of especially low concentrations or easily degradable portions (e.g. of PET, PA6.6, PA6, PAN, PUR/elastane, PP, optical brighteners or lubricants from the textile processing) is detected, it may be advantageous to supply the small parts of the used textiles only to a later point in time to the boiling process. This supplying time may be optimized with respect to achieving, that the number of undesired chain breaks is minimized. The same may be optimized in the different direction: in case of an especially high foreign material contamination of the starting material, the wood material may be added later, again with the same optimization-target of the chain length maximizing.

According to a further embodiment, providing the second starting material comprises: adjusting a substantially predefined composition, wherein adjusting comprises: i) selectively enriching at least one composition component, and/or ii) selectively depleting at least one composition component. This has the advantage, that desired properties of the second starting material, the mixed starting material, or the molded body to be manufactured may be specifically controlled.

In the context of this document, the term "predefined composition" may in particular denote a portion and/or a concentration of at least two composition components within a starting material. For example, the starting material may be a used textile and the components may be cellulose fibers and synthetic (plastic) fibers. In this case, the concentration and/or a concentration range may be predefined respectively for cellulose fibers and synthetic fibers, to therefore provide a predefined composition. The defined composition may encompass absolute values or value ranges.

In an embodiment; especially proper results may be achieved, when the starting material was sorted with respect to its composition. In this way; cellulosic molded bodies may be manufactured, which contain a portion of >1% (in particular <10%) of natural fibers (cotton); wherein the average chain length of the pulp portion which origins from the recyclate is above 300 glucose units, and wherein respectively per polymer fiber type <5% portions of synthetic polymer fibers are contained.

In an embodiment; different starting materials (raw recyclates) with a different composition are mixed, such that the desired portions of the different plastics and further additional constituents result. This chemical-reduced/chemical-free embodiment (only achieved by mixing raw recyclates) is especially interesting with respect to the resource consumption and due to ecological aspects. The cellulosic molded bodies which are manufactured from such a mixture, despite a variable raw recyclate quality, have a constant quality with respect to the resulting final properties and the depletion in the course of the boiling process according embodiments of to the invention.

According to a further embodiment, forming the cellulosic molded body from the treated starting material comprises one of the group, which is consisting of: a direct solving method, in particular a lyocell method; a viscose method (in particular a xanthogenate method, a carbamate method, or a cold alkali method), a paper manufacturing method. This may have the advantage, that especially efficient and approved methods may be directly applied to the treated mixed starting material, to manufacture a (regenerated) cellulosic molded body.

A combination of both boiling processes (first and second starting material) includes the generation of a new waste lye mixture directly in the digestion process. This waste lye comprises: i) lignin; ii) at least one reaction product from a boiling process, in particular a sulfate process or a sulfite process (or an organosolv/gamma-valerolactone process), further in particular one of the group, which is consisting of: sodium sulfate, sodium sulfide, calcium oxide, magnesium oxide, and sulfur dioxide; (optionally: cellulose with a substantially low average degree of polymerization (in particular with an average degree of polymerization of less than 200 monomers)), and iii) at least one of the group, which is consisting of: cotton fibers and synthetic fibers (in particular plastic fibers).

This new waste lye may be used as energy production medium (energy carrier), by which both an energy problem and a disposal problem may be solved. An already known praxis, the recovery of inorganic reaction products, i.e. sodium sulfate; magnesium oxide, sulfur dioxide, from the flue gas and/or the ashes, remains with such a process control. However, recently; the products from the textile digestion are included, so that the waste disposal and the energy production are likewise improved.

The described waste lye may comprise an advantageous increased calorific value. Besides lignin, inorganic reaction products, and tree resins, the described waste lye may be enriched by organic fragments made of synthetic fibers and additives which may be used for covering the energy demand of a pulp-factory.

Furthermore, the described waste lye may be efficiently used as chemical product-recovery medium.

In the following, exemplary embodiments of the present invention are described in detail with reference to the following figures.

DETAILED DESCRIPTION OF EXEMPLARY EMBODIMENTS

FIG. 1 shows a flow diagram of a method for providing a treated cellulose-comprising mixed starting material according to an exemplary embodiment of the invention.

FIGS. 2a and 2b respectively show a further flow diagram of a method for providing a treated cellulose-comprising mixed starting material according to an exemplary embodiment of the invention.

Same or similar components in different figures are provided with the same reference numbers.

Figure 1:
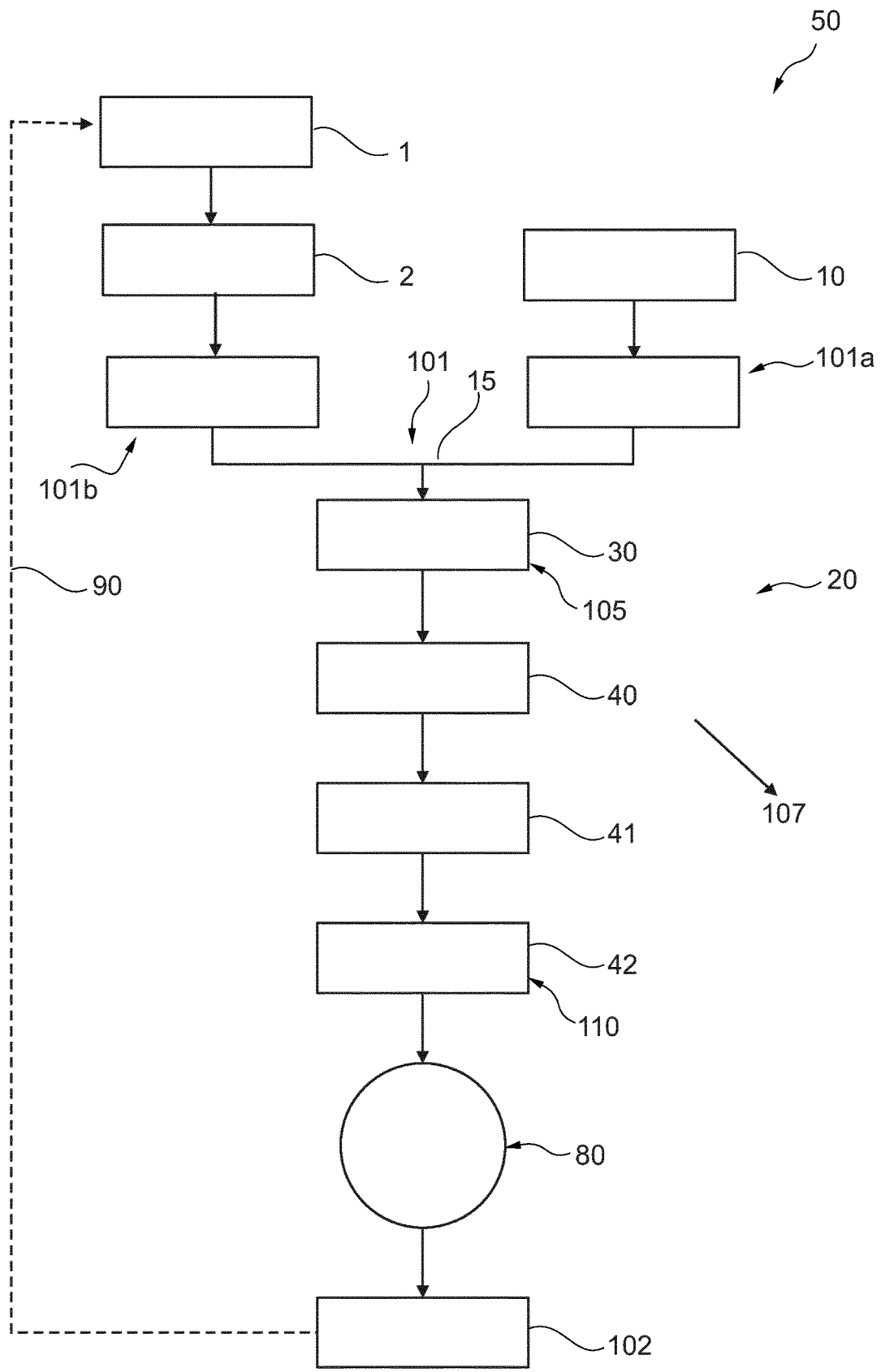

Before, referring to the figures, exemplary embodiments are described, some basic considerations shall be summarized, based on which exemplary embodiments of the invention have been derived.

According to an exemplary embodiment, the following advantages may be provided by the described method:

i) removing almost all disturbing foreign matters (in particular plastic fibers) by saponification, reduction, and degradation in the course of the boiling process.

ii) enabling the use of conventional industrial plants for a cellulose-extraction from wood for textile recycling.

iii) improving the stirrability compared to a pure textile boiling.

iv) enabling an optimal mixing of raw cellulose from wood with recycling cellulose from textiles, with the possibility of generating the desired composition, in particular with respect to optimal chain lengths.

v) increasing the calorific value of the waste lye, containing lignin, sulfonic acid/salt, tree resins, now enriched by organic fragments made of synthetic fibers and additives which may be used for covering the energy demand of a pulp-factory.

vi) for the subsequent fiber production, wood types may be used, which would not deliver a sufficient cellulose quality by their own. The portion of high-quality cellulose from cotton or cellulosic synthetic fibers leads to a useful cellulose base.

vii) by a possible combination of low wood qualities with low-quality (damaged) used textile-fractions, a suitable cellulose quality may nevertheless be generated, at least for the paper production.

viii) separately sorting used textiles, which is especially elaborate in terms of personnel and cannot operate in an error-free manner due to the more complex compositions, is omitted.

ix) a special object may be to provide cellulose-pulp also from the textile recycling, which, with respect to the purity and balanced chain lengths, is suitable for a large-scale fiber production according to the lyocell method.

x) a special characteristic of the method according to embodiments of the invention may be the common bleaching, if the boilings are performed separately or at least partially separately.

According to an exemplary embodiment, as a special advantage of the method, the combination of different process elements in an existing industrial plant may be realized. By an exemplary variation of the time constants T1 and T2, i.e. by varying the supply times of the material composition according to embodiments of the invention, the quality of the result of the method may be adapted within broad limits.

According to an exemplary embodiment, by suitable process stages in the course of the manufacturing process, the properties of the resulting mixed starting material and thus of the cellulosic molded body which is manufactured by such a product, may be influenced as follows:

i) a short boiling duration in NaOH (only used textiles separately, not wood-fraction) for increasing the chain length in the resulting pulp, ii) discharging a too short chain length from the production process, iii) reduction of metal oxides from used textiles-fraction (binding, filtering, etc.), iv) reduction of synthetic polymers by a selection of the second starting material, controlling the boiling duration, boiling temperature, etc. Thereby, it is achieved, that per polymer fiber type <5% portions are present in the resulting mixed starting material, and v) by controlling explicit process parameters (e.g. exposition duration), the resulting average chain length may be maximized.

According to an exemplary embodiment, the wood-fraction varies in its composition (e.g. when woods with different property characteristics are mixed). Since, in particular in case of raw recyclates, an even broader quality distribution and composition of the single textile recyclate components is present, this thought may also be brought in the described method on the one hand for the textile-fraction, but additionally it may be refined to the fact that, at the textile-fraction, it may not only be mixed, but also removed by sorting. Since these sorting processes in turn represent a standard method in the textile recyclate treatment, such an effort-optimized implementation of the expanded mixing method according to embodiments of the invention is possible: i) sortingly mixing different textile types from the recyclate textiles, or ii) in the course of the same process, removing by sorting and removing of possibly not desired by-products from the textile recyclates.

FIG. 1 shows a flow diagram of a method for providing (see reference sign 50) a treated cellulose-comprising mixed starting material 110 according to an exemplary embodiment of the invention. At first, two starting materials 101a, 101b are provided independently from each other.

The first providing (see reference sign 10) encompasses providing a first starting material 101a, which comprises a lignocellulosic raw material, in particular a wood material. This wood material is prepared by removing the bark in a known manner. Moreover, the wood material is comminuted to wood chips. The wood chips of the first prepared starting material 101a comprise an average length in the range of 2 to 8 cm and an average thickness in the range of 0.2 to 2.0 cm after comminuting.

The second providing (see reference sign 1) encompasses providing a second starting material 101b which is a cellulose-containing (substantially) lignin-free product, in particular a mixture of used textiles (used clothes and/or remains from a clothing manufacture). It may be delivered from different sources (pre-/post-consumer) and may be very inhomogeneous. The used textiles do not only comprise cellulose, but also partially high contents of synthetic fibers (e.g. polyester). In a first stage of providing, at first, mechanically comminuting the used textiles by shredding may be performed. Thereby, mainly large non-cellulosic disturbing matters may be removed from the second starting material, for example buttons, seams, and prints of the used clothes which were least partially used for generating the starting material. By mechanically comminuting, the second starting material may be separated into single fibers, for example.

In a further stage, the composition of the used textiles is determined (see block 2). Optionally, this stage may also be performed before comminuting. Determining the composition may be (continuously) performed at a (recycling) stream of used textiles. For this purpose, different automatic measurement techniques (e.g. optical and/or spectroscopic methods) may be used. Alternatively, also a skilled operator may determine the composition. Furthermore, the composition may be at least partially pre-known (e.g. in case of clothing remains from the production). The determined composition (actual value) may subsequently be compared with a target value of the predefined composition. Corresponding to the deviation from the target value, selectively enriching and/or selectively depleting may be performed. The starting material is a used textile mixture with cellulose fibers and synthetic fibers. To achieve a predefined composition, charges with known compositions (known amounts of composition components) are mixed, such that the mixture finally comprises the predefined composition. Especially suitable are the above described (cutting waste) remains from the clothing production, which comprise a substantially known composition. Moreover, used textiles with a known composition, e.g. a very high cotton content, may be added, to increase the cellulose content. Furthermore, also composition components with at least partially known composition may be removed from the starting material 101. For example, specifically sportswear may be removed, which comprises an especially high amount of polyester. Moreover, mechanically separating, e.g. a density separation, in particular by a flotation method, may be performed, to selectively deplete e.g. polyester from the cellulose. Furthermore, providing may comprise mechanically separating the non-cellulosic foreign matters and/or chemically separating the non-cellulosic or in matters. After these method stages, the prepared second starting material 101b may be provided.

In the here described embodiment, the first starting material 101a and the second starting material 101b are mixed prior to a common boiling process 30 in a reaction device 105, i.e. a boiler, to a mixed starting material 101 (see reference sign 15). Alternatively, mixing may be performed only during or subsequently of the boiling process. The first starting material 101a and the second starting material 101b may be performed such that the portion of the first starting material 101a is in the range of 10 to 99% with respect to the total weight of the solid masses.

Prior to the boiling process 30, a pre-hydrolysis may be performed. In the boiling process 30 and in the subsequent processes (reference signs 40, 41, 42), the first starting material 101a and the second starting material 101b (which were mixed to a mixed starting material 101) are commonly treated (reference sign 20), to obtain a treated cellulose-comprising mixed starting material 110.

The reactor device 105 comprises a discontinuous or a continuous boiler (digester), wherein the boiling process 30 is performed as sulfate process or as sulfite process. In a special embodiment, also a gamma-valerolactone process is possible. During the boiling process 30, oxygen is supplied, and the pressure is increased above the atmospheric pressure during the boiling process 30. The process parameters (amongst others temperature, pressure, dwell time, boiling solution, mixing, composition) of the boiling process 30 are controlled, such that desired properties in the final product are obtained.

In an embodiment, the process parameters of the boiling process 30 are controlled, such that the average chain length of the cellulose in the treated mixed starting material 110 is in a certain predefined range. Selectively depleting cellulose (fibers) is performed, whose average chain length is below a predefined value, e.g. 300 glucose units, preferably in the range of 20 to 150 glucose units. This may be achieved via mechanically separating, in particular density separation, for example.

During the boiling process 30, a waste lye 107 is generated, which comprises lignin, e.g. as Na-lignin or lignin-sulfonate, and tree resins (from the wood material), reaction products from the sulfate/sulfite-process (e.g. sodium sulfate, sodium sulfide, magnesium oxide, sulfur dioxide), as well as cotton fibers and synthetic (plastic) fibers. This special waste lye 107 constitutes an especially well combustible energy medium, by which energy, e.g. for the boiling process 30, may be generated.

Subsequently of the boiling process 30, a bleaching process 40 is performed. Further treatment stages 20 encompass performing a cleaning process 41 and performing a drying process 42 of the mixed starting material 110 which is present as mixed pulp.

The correspondingly treated mixed starting material 110, as illustrated in block 80, is subsequently supplied to a method for manufacturing a cellulosic molded body 102. An example for such a method is a lyocell method, which is described in detail with reference to the FIGS. 3 and 4 (see below). The obtained molded body 102 (e.g. as fiber in a lyocell textile or also a paper fiber) may be again recycled after use (illustrated with reference sign 90) and may be supplied to the second starting material 101*b* again.

Figure 2A:
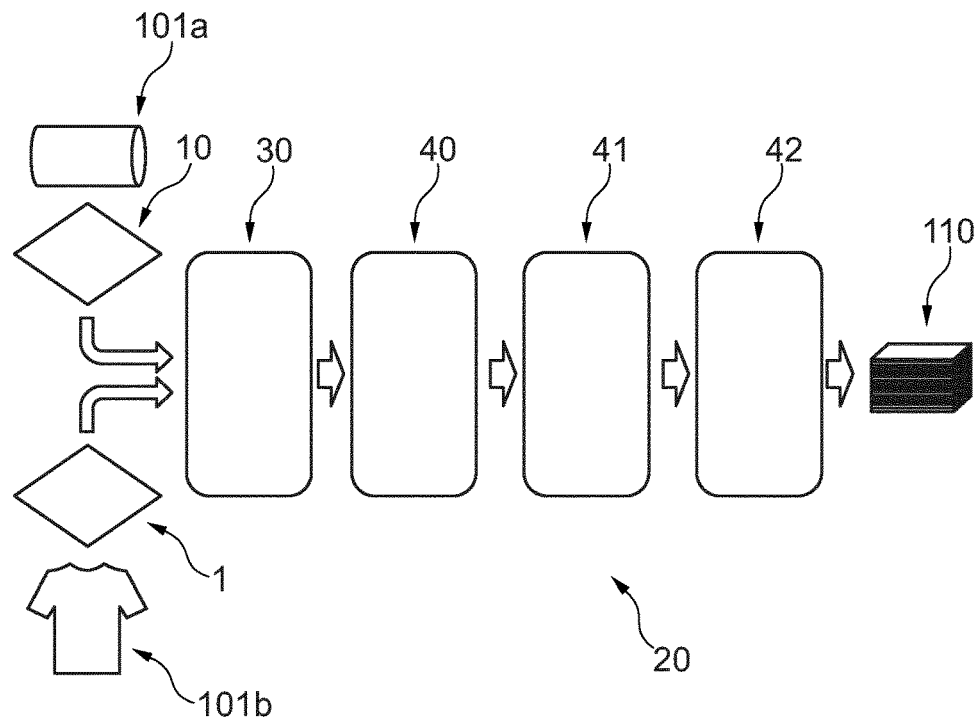
Figure 2B:
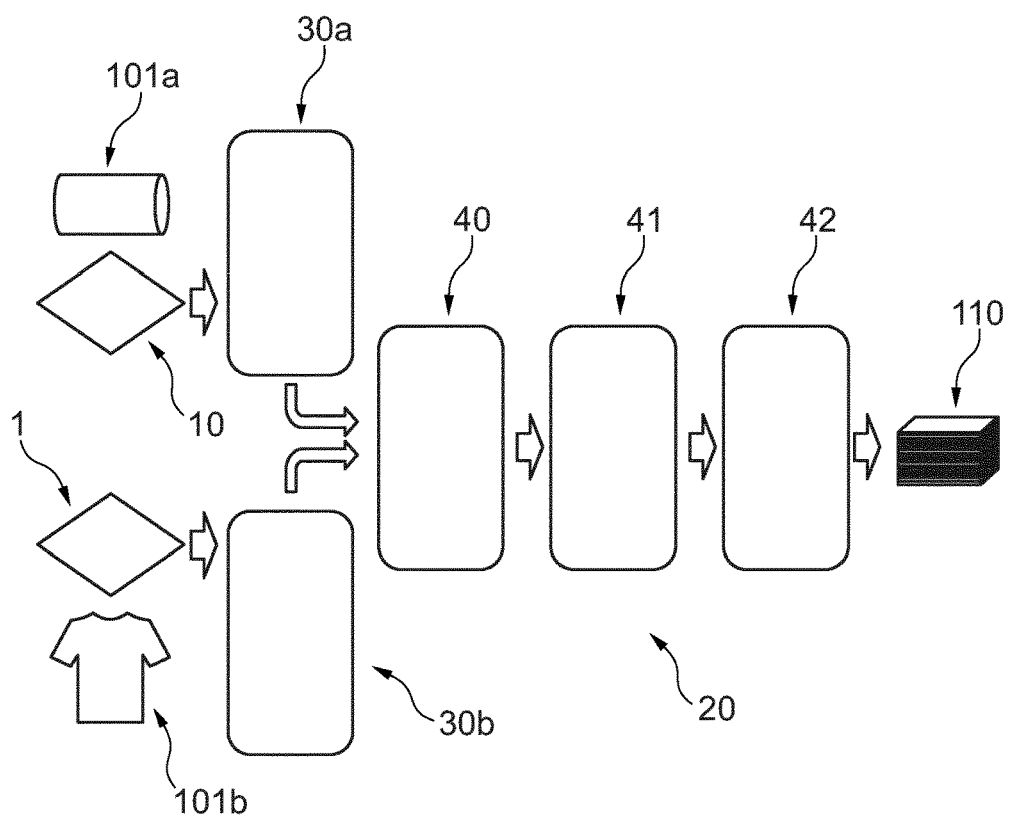

FIGS. 2*a* and 2*b* respectively show a further flow diagram of a method for providing a treated cellulose-comprising mixed starting material according to an exemplary embodiment of the invention.

FIG. 2*a*: as described above for FIG. 1, the first starting material 101*a* and the second starting material 101*b* are at first separately treated (reference signs 1 and 10) and are then mixed to a mixed starting material 101 before or during a boiling process 30. The common boiling of comminuted wood- and used textile portions is used in a ratio with respect to each other, which corresponds to the application-oriented use of the obtained treated mixed starting material (e.g. pulp mixture) with respect to the fiber lengths and the macromolecular structure.

FIG. 2*b*: in this embodiment, the boiling process 30 is performed separately for each starting material 101*a*, 101*b* (parallel boiling), so that a first boiling process 30*a* of the first starting material 101*a* (sulfate or sulfite process) and a second boiling process 30*b* of the second starting material 101*b* (sulfate/sulfite process or alkaline boiling (NaOH)) are performed. Subsequently, mixing is performed still during the treatment 20, and a common bleaching process 40 is performed.

Furthermore, a time synchronization of the different boiling lines (e.g. for a continuous method) may be performed. Also a partially simultaneous boiling (despite a separate pre-boiling) may be performed.

Figure 3:
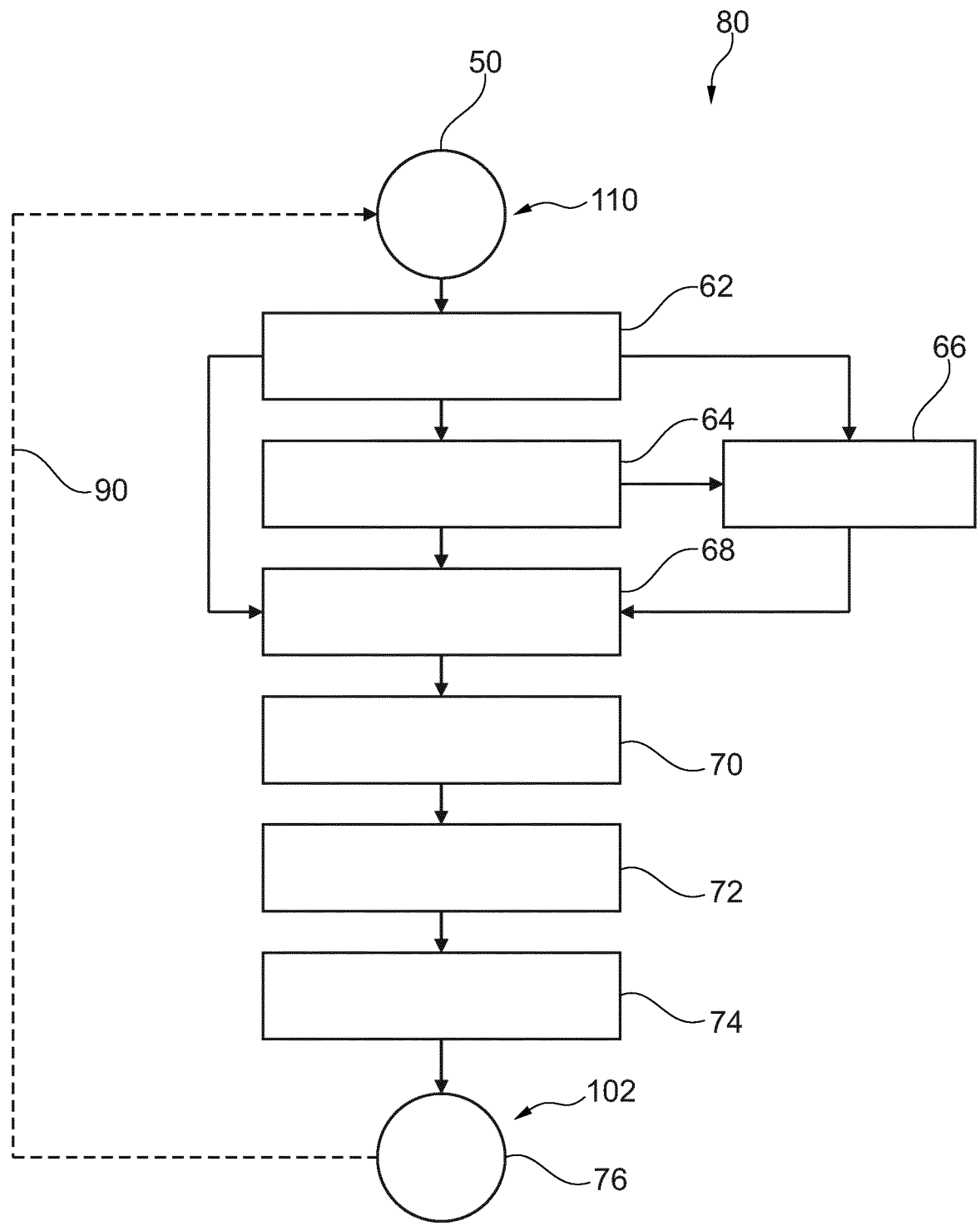
FIG. 3 shows a flow diagram of a method for manufacturing a regenerated cellulosic molded body from the treated mixed starting material according to an exemplary embodiment of the invention.

FIG. 3 shows a flow diagram 80 of a method for manufacturing a regenerated cellulosic molded body 102 (compare FIG. 4) from the treated mixed starting material 110 according to an exemplary embodiment of the invention.

The mixed starting material 110 is provided by a treatment process (see block 50, compare FIGS. 1 and 2). As illustrated with block 50, a such manufactured treated mixed starting material 110 may be used for a subsequent lyocell- or viscose method, wherein the former is described in more detail in the following.

In the following, it is described, how on basis of the cellulose-comprising mixed starting material 110, regenerated molded bodies 102 made of cellulose according to an embodiment of the invention may be manufactured. For this purpose, the mixed starting material 110 is supplied to a device (100, see FIG. 4) for performing a lyocell method. At first, optionally preparing (stage 62) the treated mixed starting material 110 is performed, e.g. cleaning or comminuting.

It is also possible (block 64) to commonly use the cellulose-comprising mixed starting material 110 together with other cellulose-comprising materials for the subsequent lyocell-method. Thus, the mixed starting material 110 may be mixed with a further starting material, which comprises cellulose and at least one synthetic plastic, see block 64. This supplied further starting material comprises a portion of synthetic plastics which is different from the portion of synthetic plastic in the mixed starting material 110. Generating the regenerated cellulosic molded body may now be performed based on the mixed starting material 110 and the further starting material, so that the regenerated cellulosic molded body 102 contains a predetermined portion of synthetic plastic. Alternatively or additionally, the further starting material may comprise remains from a clothing manufacture, for example. Furthermore, the further starting material may comprise used paper.

Directly after preparing 62 and/or directly after mixing 64, directly solving 68 the (pure and/or mixed) mixed starting material 110 in a further solvent 116 (for example tertiary amine oxides, such as N-methylmorpholine-N-oxide (NMMO), for example) may be performed, advantageously without chemical pretreatment. In more detail, the mechanically comminuted (and optionally mixed) mixed starting material 110 may be directly transferred into solution, in particular without a chemical cleaning and without an adjustment of the viscosity. In this way, the manufacturing- and/or recycling method may be performed exceptionally simple and rapid and ecological.

Alternatively, the method may comprise optionally chemically cleaning 66 the mixed starting material 110 after preparing 62 (or after mixing 64) and prior to solving 68. Such an optional cleaning 66 may comprise at least partially removing colorants by bleaching, for example. It is thereby possible to entirely or partially discolor the starting material 110 prior to subsequently solving 68 the starting material 110 in a solvent 116, for example to manufacture white or grey molded bodies 102. Alternatively or additionally, it is also possible, that in the context of optionally chemically cleaning 66, the mixed starting material 110 (prior or after its solving 68) is at least partially freed from cross-linkers which are cross-linking the fibers of the mixed starting material 110. By cleaning 66, at least a part of synthetic plastic may be optionally removed, if desired. For example, in this way, the portion of synthetic plastic in the molded body 102 to be manufactured may be adjusted and/or influenced.

After solving 68 the mixed starting material 110 in the solvent (preferably NMMO), the obtained lyocell spinning solution 104 may be pressed through one or more spinning nozzles, whereby threads and/or filaments of a honey-like viscosity are generated (see block 70 which relates to spinning).

During and/or after the fall of these threads and/or filaments, they are brought in operational connection with an aqueous milieu and are thereby thinned. The concentration of the solvent 116 of the threads and/or filaments is thereby reduced in an aqueous fog and/or an aqueous liquid bath to such an extent, that the lyocell spinning solution is transferred into a solid phase made of cellulose-filaments. In other words, a precipitating, precipitation, or coagulating of the cellulose-filaments occurs, see reference sign 72. Thereby, a preform of the molded body 102 is obtained.

Furthermore, the method may comprise post-treating 74 the precipitated lyocell-cellulose for obtaining the molded body 102 from the preform of the molded body 110. Such a posttreatment may encompass drying, impregnating and/or reshaping the obtained filaments to the final molded body 102, for example. For example, the molded body 102 may be processed by the described manufacturing method to fibers, a foil, a tissue, a fleece, a sphere, a porous sponge, or beads and may then be supplied to a further use (compare reference sign 76).

Advantageously, after the use of the molded body 102, its cellulose and optional synthetic plastics may be recovered again by performing a further method corresponding to the method stages between the reference signs 50 and 74 (see block 90). Alternatively, the cellulose and the optional further synthetical plastic of the molded body 102 may be recovered in another method, for example a viscose method.

Figure 4:
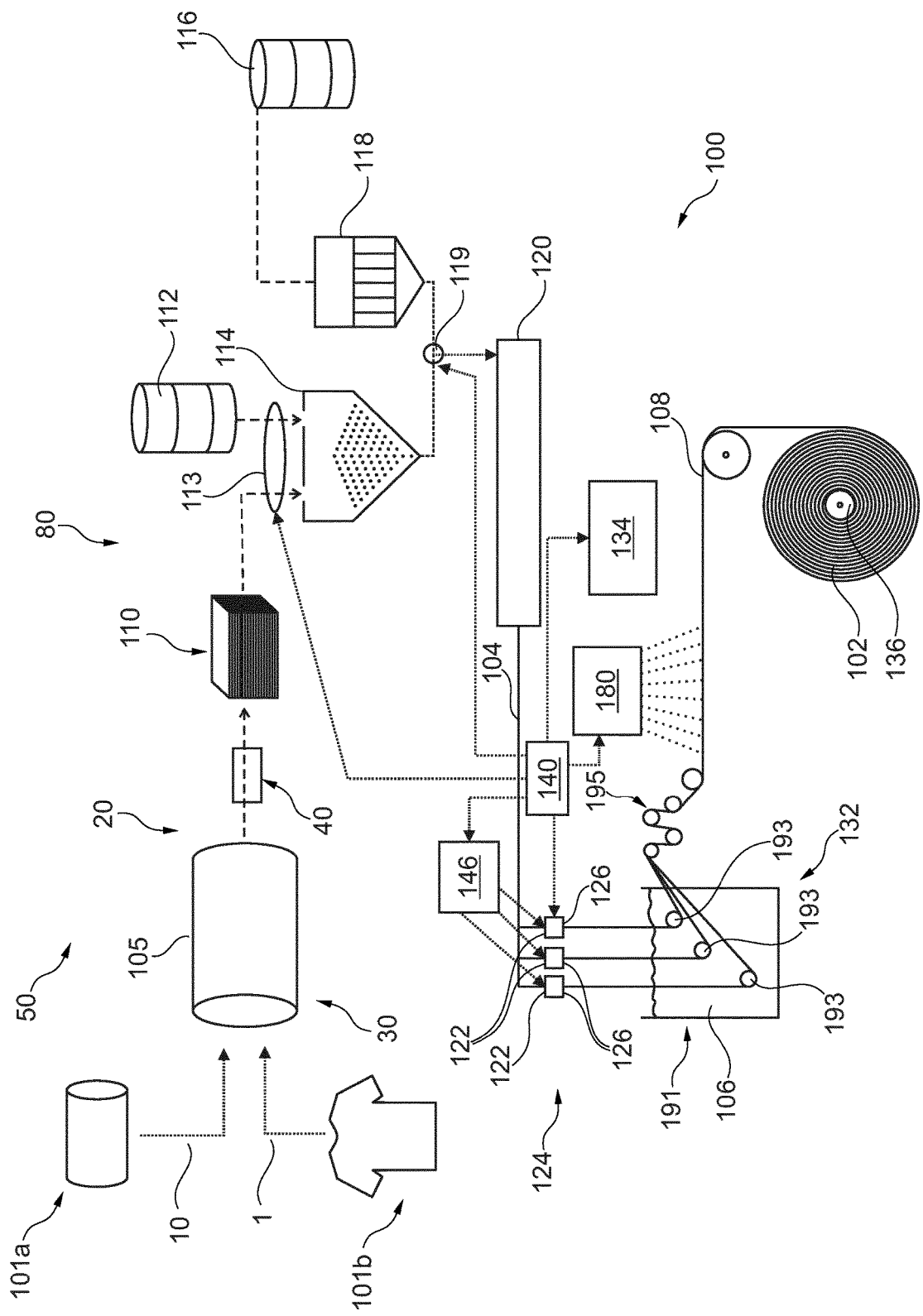
FIG. 4 shows a device for providing the treated mixed starting material and for manufacturing a regenerated cellulosic molded body by a lyocell method from the treated mixed starting material according to an exemplary embodiment of the invention.

FIG. 4 shows a device 100 for providing a treated cellulose-comprising mixed starting material 110 and for manufacturing a regenerated cellulosic molded body 102 by a lyocell method on basis of the mixed starting material 110, according to an exemplary embodiment of the invention, which is described with reference to the FIGS. 1 and 2. A first starting material 101a which comprises wood material, and a second starting material 101b which comprises used textiles, are separately provided (reference signs 1 and 10) and are then mixed, to be commonly treated (reference sign 20). For this purpose, the mixture is at first supplied to a boiling process 30 in a reactor device 105, wherein the starting materials are commonly boiled. Subsequently, a common bleaching process 40 is performed, so that the treated cellulose-comprising mixed starting material 110 is provided.

FIG. 4 shows a device 100 according to an exemplary embodiment of the invention for manufacturing a cellulose-comprising molded body 102 which may be manufactured in form of a fleece (nonwoven) as a fiber, a foil, a sphere, a textile tissue, a sponge, or in form of beads or flakes. According to FIG. 4, the molded body 102 is manufactured directly from a spinning solution 104. The latter is converted by a coagulation fluid 106 (in particular made of air humidity) and/or a coagulation bath 191 (for example a water bath which optionally comprises tertiary amine oxides, such as N-methylmorpholine-N-oxide (NMMO)) into cellulose fibers 108 as molded body 102. By the device 100, a lyocell method may be performed. In this way, as molded body 102, for example substantially endless filaments or fibers 108 or mixtures of substantially endless filaments and fibers 108 of a discrete length may be manufactured. A plurality of nozzles which respectively have one or more openings 126 (which may also be denoted as spinning holes) are provided, to eject the lyocell spinning solution 104.

As can be taken from FIG. 4, the treated cellulose-comprising mixed starting material 110 may be supplied to a storage reservoir 114 to the lyocell method 80 via a dosing unit 113.

According to an embodiment, a water introduction into the cellulose-based mixed starting material 110 may be performed by a solvent 116 which is described in more detail below (in particular NMMO). Also the cellulose-based mixed starting material 110 itself may already contain a certain residual humidity (dry pulp frequently has a residual humidity of 5 weight percent to 8 weight percent, for example). In particular, according to the described embodiment, the mixed starting material 110 may be directly given into a mixture of water and solvent 116 without a premoistening. An optional water container 112 which is shown in FIG. 4 may then be omitted.

According to an alternative embodiment, the cellulose-comprising mixed starting material 110 may be additionally moistened, to thereby provide humid cellulose. For this purpose, water from an optional water container 112 may be supplied to the storage reservoir 114 via the dosing unit 113. Therefore, the dosing unit 113, controlled by a control unit 140, may supply adjustable relative amounts of water and mixed starting material 110 to the storage reservoir 114.

A suitable solvent 116, preferably tertiary amine oxides, such as N-methylmorpholine-N-oxide (NMMO), respectively an aqueous mixture of the solvent 116, for example a 76% solution of NMMO in water, is contained in a solvent container. The concentration of the solvent 116 may be adjusted in a concentration unit 118 by adding either pure solvent or water. The solvent 116 may then be mixed with the mixed starting material 110 with definable relative amounts in a mixing unit 119. Also the mixing unit 119 may be controlled by the control unit 140. Thereby, the cellulose-comprising mixed starting material 110 is solved in the concentrated solvent 116 in a solving unit 120 with adjustable relative amounts, whereby the lyocell spinning solution 104 is obtained. The relative concentration ranges (also denoted as spinning window) of the components starting material 110, water, and solvent 116 in the spinning solution 104 for manufacturing cellulosic regenerate molded bodies according to the lyocell method may be adjusted in a suitable manner, as known to a skilled person.

The lyocell spinning solution 104 is supplied to a fiber generation unit 124 (which may be formed with a number of spinning bars or jets 122).

When the lyocell spinning solution 104 is guided through the openings 126 of the jets 122, it is separated into a plurality of parallel threads made of lyocell spinning solution 104. The described process control transforms the lyocell spinning solution 104 into increasingly long and thin threads, whose properties may be adjusted by a corresponding adjustment of the process conditions, controlled by the control unit 140. Optionally, a gas flow may accelerate the lyocell spinning solution 104 on its way from the openings 126 to a fiber receiving unit 132.

After the lyocell spinning solution 104 has moved through the jets 122 and further downwardly, the long and thin threads of the lyocell spinning solution 104 interact with the coagulation fluid 106.

In the interaction with the coagulation fluid 106 (for example water), the solvent concentration of the lyocell spinning solution 104 is reduced, so that the cellulose of the starting material 110 coagulates and/or precipitates at least partially as long and thin cellulose fibers 108 (which may still contain residues of solvent and water).

During or after the initial formation of the individual cellulose fibers 108 made of the extruded lyocell spinning solution 104, the cellulose fibers 108 are received at the fiber receiving unit 132. The cellulose fibers 108 may immerse into the coagulation bath 191 which is illustrated in FIG. 4 (for example a water bath, optionally comprising a solvent, such as NMMO) and may complete their precipitation in the interaction with the liquid of the coagulation bath 191. Depending on the process adjustment of the coagulation, the cellulose may form cellulose fibers 108 (as shown, wherein the cellulose fibers 108 are made of one substance and/or are integrally merged with each other ("merging") or may be present as separate cellulose fibers 108), or at the fiber receiving unit 132, a foil and/or a film made of cellulose may form (not illustrated in FIG. 4).

Thus, the cellulose fibers 108 are extruded out of the spinning nozzles of the jets 122 and are guided through the spinning bath and/or coagulation bath 191 (for example containing water and NMMO in low concentration for precipitation/coagulation), wherein the cellulose fibers 108 are guided around a respective redirecting roller 193 in the coagulation bath 191 and are supplied to a withdrawal galette (German: Abzugsgalette) 195 outside of the coagulation bath 191. The withdrawal galette 195 serves for a further transport and post-stretching of the cellulose fibers 108, to achieve a desired titer. Downstream of the withdrawal galette 195, the fiber bundle made of the cellulose fibers 108 is washed in a washing unit 180, if necessary scrooped (German: aviviert) and finally cut (not shown).

Although not illustrated in FIG. 4, a solvent 116 of the lyocell-spinning solution 104, which is removed from the cellulose fibers 108 during coagulation and a subsequent washing in the washing unit 180, may be at least partially recovered and/or recycled, and may be transferred into the storage container 114 again in a subsequent cycle.

During the transport along the fiber receiving unit 132, the molded body 102 (here in form of the cellulose fibers 108) may be washed by the washing unit 180, by the latter supplying a washing liquid for removing solvent residues. Subsequently, the molded body 102 may be dried.

Moreover, the molded body 102 may be subjected to a posttreatment, see the schematically illustrated posttreatment unit 134. For example, such a posttreatment may comprise a hydroentanglement, a needling, an impregnation, a steam treatment with a steam which is supplied under pressure, and/or a calendaring, etc.

The fiber receiving unit 132 may supply the molded body 102 to a winding unit 136, at which the molded body 102 may be wound up. The molded body 102 may then be supplied as rolling freight to an entity which manufactures products, such as wipes or textiles, on basis of the molded body 102.

Figure 5:
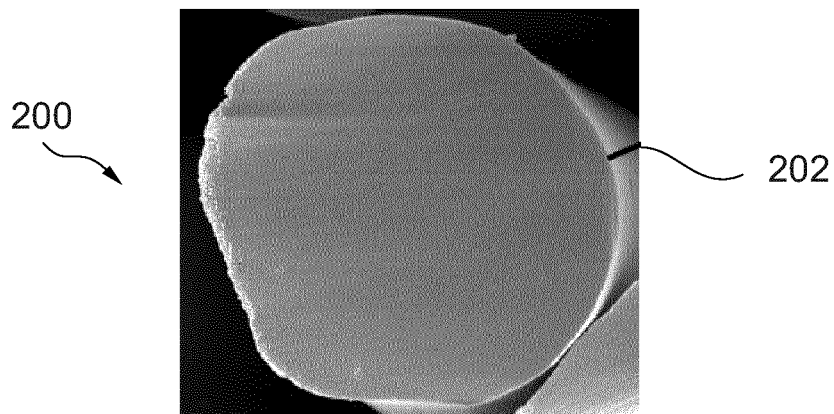
FIG. 5 shows a cellulose fiber which is manufactured by a lyocell method.

FIG. 5 shows a cellulose fiber 200 in cross-section which is manufactured by a lyocell-method. The cellulose fiber 200 which is manufactured by a lyocell-method has a smooth round outer surface 202 and is homogenous and free of microscopic holes filled with cellulose material. Thus, it may be distinctly differentiated by a person skilled in the art from cellulose fibers which are manufactured by a viscose method (see reference sign 204 in FIG. 6) and from cellulose fibers made of cotton plants (see reference sign 206 in FIG. 7).

Figure 6:
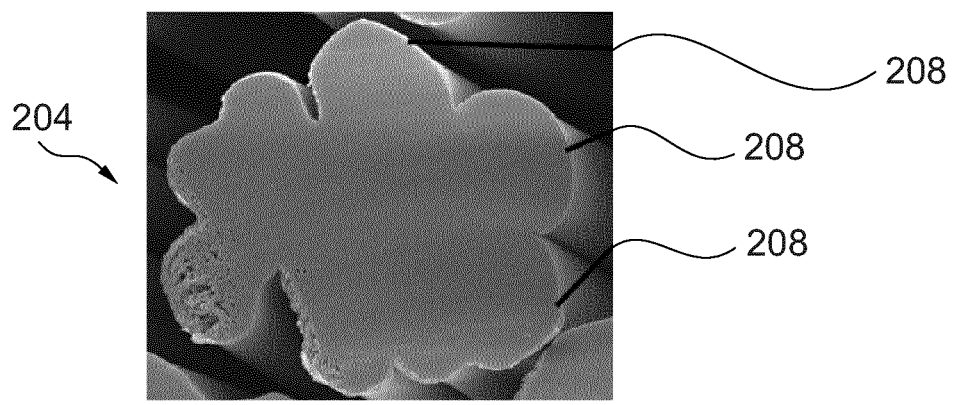
FIG. 6 shows a cellulose fiber which is manufactured by a viscose method.

FIG. 6 shows a cellulose fiber 204 in cross-section which is manufactured by a viscose-method. The cellulose fiber 204 is cloud-shaped and comprises a plurality of arc-shaped structures 208 along its outer circumference.

Figure 7:
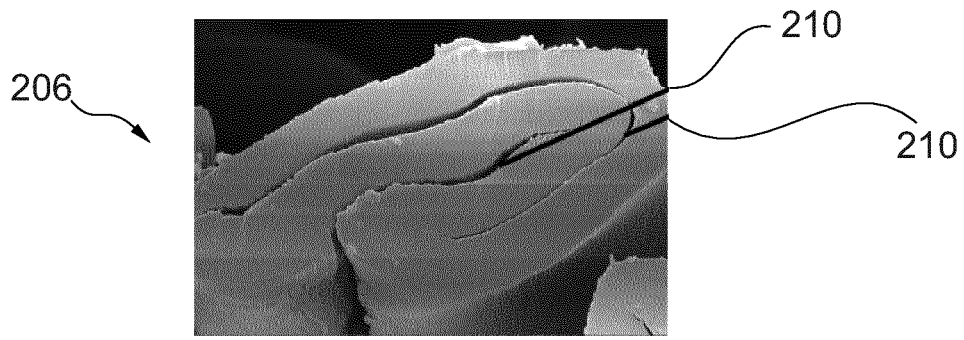
FIG. 7 shows a natural cellulose fiber of a cotton plant.

FIG. 7 shows a natural cellulose fiber 206 of a cotton plant in cross-section. The cellulose fiber 206 is kidney-shaped and comprises a lumen 210 which is free of material as fully circumferentially enclosed hollow in its interior.

By means of the significant geometrical and/or structural, differences of the fibers according to FIG. 5 to FIG. 7, it is possible for a person skilled in the art, for example by a microscope, to unambiguously determine, if a cellulose fiber is formed by the lyocell-method, by the viscose-method, or is naturally formed in a cotton plant.

Supplementary, it is to be noted, that "comprising" does not exclude other elements or steps, and "a" or "an" does not exclude a plurality. Furthermore, it is noted, that features or steps, which are described with reference to one of the above embodiments, may also be used in combination with other features or steps of other embodiments described above. Reference signs in the claims shall not be construed as limitation.

The invention claimed is:

1. A method for providing a treated cellulose-comprising mixed starting material for forming are generated cellulosic molded body, wherein the method comprises:
   providing a first starting material which comprises a lignocellulosic raw material;
   providing a second starting material which comprises a cellulose-containing lignin-free product,
   wherein the cellulose-containing lignin-free product comprises textiles;
      mixing the first starting material and the second starting material to a mixed starting material; and
      at least partially commonly treating the first starting material and the second starting material for obtaining a treated cellulose-comprising mixed pulp;
      wherein providing the second starting material comprises at least one of the following features:
      preparing the cellulose-containing lignin-free product;
      adjusting a substantially predefined composition, wherein adjusting comprises:
      selectively enriching at least one composition component, and/or
      selectively depleting at least one composition component.

2. The method according to claim 1,
   wherein the lignocellulosic raw material comprises at least one of the group, which is consisting of: a wood material, annual plants.

3. The method according to claim 2, wherein providing the first starting material comprises at least one of the following features:
   preparing the lignocellulosic raw material;
   wherein the wood chips of the first starting material comprise an average length in the range of 2 to 8 cm and/or an average thickness in the range of 0.2 to 2.0 cm.

4. The method according to claim 1,
   wherein the cellulose-containing lignin-free product comprises used textiles.

5. The method according to claim 1,
   wherein the textiles comprise non-cellulosic foreign matters, and wherein providing further comprises:

mechanically separating at least a part of the non-cellulosic foreign matters; and/or chemically separating at least a part of the non-cellulosic foreign matters.

6. The method according to claim 1, wherein treating comprises at least one of the following features:
performing a bleaching process;
performing a cleaning process;
performing a drying process of the mixed pulp;
supplying an oxidizing agent to a boiling process;
increasing the pressure during the boiling process above the atmospheric pressure;
mixing the first starting material and the second starting material, such that the portion of the first starting material is in the range of 1 to 99% with respect to the total weight of the solid masses;
mixing the first starting material in form of a liquid cellulose suspension with the second starting material in form of a liquid cellulose suspension;
performing a boiling process, such that the average degree of polymerization of the cellulose is within a predefined range;
performing an enzyme process;
performing a continuous process.

7. The method according to claim 1, wherein mixing further comprises:
mixing the first starting material and the second starting material at one of the following points in time:
prior to a pre-hydrolysis;
prior to the boiling process;
during the boiling process;
after the boiling process;
prior to the bleaching process;
during a bleaching sequence;
after the bleaching process;
prior to a drying.

8. The method according to claim 7, wherein mixing further comprises:
supplying the first starting material to the boiling process and subsequently supplying the second starting material to the boiling process; or
supplying the second starting material to the boiling process and subsequently supplying the first starting material to the boiling process.

9. A method for manufacturing a regenerated cellulosic molded body, the method comprising:
providing a treated cellulose-comprising mixed starting material according to claim 1; and
forming the cellulosic molded body from the treated cellulose-comprising mixed starting material.

10. The method according to claim 9, comprising at least one of the following features:
wherein forming the regenerated cellulosic molded body from the treated cellulose-comprising mixed starting material comprises one of the group, which is consisting of: a direct solving method, a viscose method a paper manufacturing method;
wherein the regenerated cellulosic molded body is selected from the group, which is consisting of: a filament, a fiber, a foil, a sponge, a microsphere, a bead, a fleece material, or a paper material.

11. A mixed pulp manufactured according to claim 1, which comprises at least one of the following features:
intrinsic non-cellulosic foreign matters;
synthetic fibers;
10% or less cellulose with an average degree of polymerization in the range of 50 to 200 monomers;
cellulose with an average degree of polymerization of 300 monomers or more;
a portion of natural fibers, which is larger than 1%.

12. The method according to claim 1, wherein treating comprises:
performing a boiling process.

13. The method according to claim 12, wherein treating comprises:
performing the boiling process by at least one of the group, which is consisting of: a sulfate process, a sulfite process, an organosolv process, a process with an ionic liquid.

* * * * *

UNITED STATES PATENT AND TRADEMARK OFFICE
CERTIFICATE OF CORRECTION

PATENT NO. : 12,116,729 B2
APPLICATION NO. : 17/596098
DATED : October 15, 2024
INVENTOR(S) : Richard Herchl et al.

Page 1 of 1

It is certified that error appears in the above-identified patent and that said Letters Patent is hereby corrected as shown below:

In the Claims

In Column 28, Line 28, in Claim 1, delete "are generated" and insert -- a regenerated --.

In Column 30, Line 15, in Claim 10, after "method" insert -- or --.

Signed and Sealed this
Eleventh Day of February, 2025

Coke Morgan Stewart
*Acting Director of the United States Patent and Trademark Office*